US009589580B2

(12) United States Patent
Hersbach et al.

(10) Patent No.: US 9,589,580 B2
(45) Date of Patent: Mar. 7, 2017

(54) SOUND PROCESSING BASED ON A CONFIDENCE MEASURE

(75) Inventors: Adam A. Hersbach, The Patch (AU); Stefan J. Mauger, Macleod (AU); John M. Heasman, Albert Park (AU); Pam W. Dawson, Malvern East (AU)

(73) Assignee: Cochlear Limited, Macquarie University, NSW (AU)

( * ) Notice: Subject to any disclaimer, the term of this patent is extended or adjusted under 35 U.S.C. 154(b) by 1316 days.

(21) Appl. No.: 13/047,325

(22) Filed: Mar. 14, 2011

(65) Prior Publication Data

US 2012/0239385 A1 Sep. 20, 2012

(51) Int. Cl.

| | |
|---|---|
| ***G10L 25/00*** | (2013.01) |
| ***G10L 21/00*** | (2013.01) |
| ***G10L 15/00*** | (2013.01) |
| ***G10L 25/84*** | (2013.01) |
| ***H04R 25/00*** | (2006.01) |

(52) U.S. Cl.

CPC ............ *G10L 25/84* (2013.01); *H04R 25/505* (2013.01); *H04R 2225/43* (2013.01)

(58) Field of Classification Search

CPC ......... G10L 15/00; G10L 15/20; G10L 21/00; G10L 21/02; G10L 21/0202; G10L 21/0208; G10L 21/0232; G10L 21/0216; G10L 21/0224; G10L 21/0264; G10L 21/0318; G10L 25/84; G10L 2015/00; G10L 2021/00; G10L 2021/02; G10L 2021/0208; G10L 2021/02082; G10L 2021/0316; G10L 2021/03664; G11B 20/24; H04R 25/00; A61F 2/20

USPC ........................ 704/200, 226–228, 231, 233; 381/94.1–94.9, 98–104

See application file for complete search history.

(56) References Cited

U.S. PATENT DOCUMENTS

| | | | | |
|---|---|---|---|---|
| 5,550,924 | A * | 8/1996 | Helf et al. | 381/94.3 |
| 5,721,783 | A * | 2/1998 | Anderson | 381/328 |
| 5,757,937 | A * | 5/1998 | Itoh et al. | 381/94.3 |
| 5,833,715 | A | 11/1998 | Vachon et al. | |
| 6,035,048 | A * | 3/2000 | Diethorn | 381/94.3 |
| 6,548,313 | B1 | 4/2003 | Ravi et al. | |
| 6,730,972 | B2 | 5/2004 | Ravi et al. | |

(Continued)

FOREIGN PATENT DOCUMENTS

| | | |
|---|---|---|
| EP | 1375429 | 1/2004 |
| EP | 1424095 | 6/2004 |

(Continued)

OTHER PUBLICATIONS

Kalyan S. Kasturi. 2006. Signal Processing Strategies for Better Melody Recognition and Improved Speech Understanding in Noise for Cochlear Implants. Ph.D. Dissertation. University of Texas at Dallas, Richardson, TX, USA. Advisor(s) Philipos C. Loizou. AAI3238589.*

(Continued)

*Primary Examiner* — Paras D Shah

(57) ABSTRACT

A method for processing sound that includes, generating one or more noise component estimates relating to an electrical representation of the sound and generating an associated confidence measure for the one or more noise component estimates. The method further comprises processing, based on the confidence measure, the sound.

19 Claims, 15 Drawing Sheets

(56) References Cited

U.S. PATENT DOCUMENTS

| | | | | |
|---|---|---|---|---|
| 7,162,308 | B2 | 1/2007 | O'Brien et al. | |
| 7,221,982 | B2 | 5/2007 | Aron et al. | |
| 7,240,416 | B2 | 7/2007 | Milojevic et al. | |
| 7,383,179 | B2 * | 6/2008 | Alves et al. | 704/228 |
| 7,590,530 | B2 * | 9/2009 | Zhao et al. | 704/226 |
| 7,596,415 | B2 | 9/2009 | Brabec et al. | |
| 7,630,771 | B2 | 12/2009 | Cauller | |
| 8,131,543 | B1 * | 3/2012 | Weiss et al. | 704/233 |
| 8,135,586 | B2 * | 3/2012 | Kim et al. | 704/233 |
| 8,244,523 | B1 * | 8/2012 | Murphy | 704/226 |
| 2002/0002455 | A1 * | 1/2002 | Accardi et al. | 704/226 |
| 2004/0038251 | A1 | 2/2004 | Smalley et al. | |
| 2004/0065559 | A1 | 4/2004 | Iijima et al. | |
| 2004/0078199 | A1 * | 4/2004 | Kremer et al. | 704/233 |
| 2004/0111141 | A1 | 6/2004 | Brabec et al. | |
| 2005/0075708 | A1 | 4/2005 | O'Brien et al. | |
| 2005/0107843 | A1 | 5/2005 | McDermott et al. | |
| 2005/0203604 | A1 | 9/2005 | Brabec et al. | |
| 2006/0115409 | A1 | 6/2006 | Li et al. | |
| 2006/0129215 | A1 | 6/2006 | Helmus et al. | |
| 2006/0293887 | A1 * | 12/2006 | Zhang et al. | 704/233 |
| 2007/0005117 | A1 | 1/2007 | Fritsch et al. | |
| 2007/0016267 | A1 | 1/2007 | Griffin et al. | |
| 2007/0209093 | A1 | 9/2007 | Tohji et al. | |
| 2007/0225776 | A1 | 9/2007 | Fritsch et al. | |
| 2007/0255002 | A1 | 11/2007 | Alba | |
| 2008/0170982 | A1 | 7/2008 | Zhang et al. | |
| 2008/0201137 | A1 * | 8/2008 | Vos et al. | 704/226 |
| 2008/0203380 | A1 | 8/2008 | Wang et al. | |
| 2009/0198492 | A1 * | 8/2009 | Rempel | G10L 15/20 704/233 |
| 2009/0202091 | A1 | 8/2009 | Pedersen et al. | |
| 2010/0150364 | A1 * | 6/2010 | Buck et al. | 381/66 |
| 2010/0226501 | A1 * | 9/2010 | Christoph | 381/58 |
| 2010/0280307 | A1 | 11/2010 | Lineweaver et al. | |
| 2011/0034969 | A1 | 2/2011 | Capcelea et al. | |
| 2011/0071596 | A1 | 3/2011 | Kara et al. | |
| 2011/0106209 | A1 * | 5/2011 | Saoji | 607/57 |
| 2011/0191101 | A1 * | 8/2011 | Uhle et al. | 704/205 |

FOREIGN PATENT DOCUMENTS

| | | |
|---|---|---|
| WO | 00/71063 | 11/2000 |
| WO | 00/076912 | 12/2000 |
| WO | 02/089907 | 11/2002 |
| WO | 2004/052447 | 6/2004 |
| WO | 2005/120823 | 12/2005 |
| WO | 2006/105478 | 10/2006 |
| WO | 2007/015710 | 2/2007 |
| WO | 2007/078082 | 7/2007 |
| WO | 2007/087687 | 8/2007 |
| WO | 2007/136404 | 11/2007 |
| WO | 2008/097333 | 8/2008 |
| WO | 2008/104446 | 9/2008 |
| WO | 2008/119138 | 10/2008 |

OTHER PUBLICATIONS

International Search Report and Written Opinion of the International Application No. PCT/IB2012/051187 mailed Oct. 23, 2012 (9 pages).

International Search Report for International Application No. PCT/AU2008/001718 mailed Jan. 12, 2009.

Written Opinion for International Application No. PCT/AU2008/001718 mailed Jan. 12, 2009.

Zhang et al., "Multifunctional Carbon Nanotube Yams by Downsizing an Ancient Technology" Science, vol. 306, pp. 1358-1361, Nov. 19, 2004.

Zhang et al., "Strong, Transparent, Multifunctional, Carbon, Nanotube Sheets", Science, vol. 309, pp. 1215-1219, Aug. 19, 2005.

Meyyappan et al., "Carbon Nanotube Growth by PECVD: A Review", Plasma Sources Sci. Technol. 12 (2003) 205-216, Apr. 2, 2003 (12 pages).

* cited by examiner

MONAURAL FRONT FACING CARDIOID (CF)

MONAURAL BACK FACING CARDIOID (CB)

SPEECH IMPORTANCE FUNCTION
FROM ANSI S3.5 1997 METHODS FOR CALCULATION OF THE SPEECH INTELLIGIBILITY INDEX

SOUND PROCESSING BASED ON A CONFIDENCE MEASURE

BACKGROUND

Field of the Invention

The present invention relates generally to sound processing, and more particularly, to sound processing based on a confidence measure.

Related Art

Auditory or hearing prostheses include, but are not limited to, hearing aids, middle ear implants, cochlear implants, brain stem implants, auditory mid-brain implants, optically stimulating implants, direct acoustic cochlear stimulators, electro-acoustic devices and other devices providing acoustic, mechanical, optical, and/or electrical stimulation to an element of a recipient's ear. Such hearing prostheses receive an electrical input signal, and perform processing operations thereon so as to stimulate the recipient's ear. The input is typically obtained from a sound input element, such as a microphone, which receives an acoustic signal and provides the electrical signal as an output. For example, a conventional cochlear implant comprises a sound processor that processes the microphone signal and generates control signals, according to a pre-defined sound processing strategy. These signals are utilized to generate the electrical stimulation signals that are delivered to the recipient via an implanted electrode array.

In conventional hearing prosthesis, recipient's often have difficulty in discerning a target or desired sound from unwanted noise. This inability to distinguish desired sounds from noise is of a particular concern to a recipient's ability to understand speech.

SUMMARY

In one embodiment of the present invention, a sound processing method is provided. The method comprises: generating an electrical representation of a received sound having desired signal components and noise components; generating at least one estimate of a noise component; generating a confidence measure of the noise component estimate; and processing the electrical representation at least partially based on the confidence measure.

In another embodiment, sound processing method is provided. The method comprises: receiving a plurality of input signals representing a plurality of spectral components of a sound; selecting one or more of the input signals by processing a value representing the energy of each spectral component and a value indicating a psychoacoustic importance of each spectral component; and processing the one or selected input signals to generate stimuli for delivery to a recipient via an electrode array of a hearing prosthesis.

BRIEF DESCRIPTION OF THE DRAWINGS

Embodiments of the present invention are described below with reference to the drawings in which.

DETAILED DESCRIPTION

Figure 1:
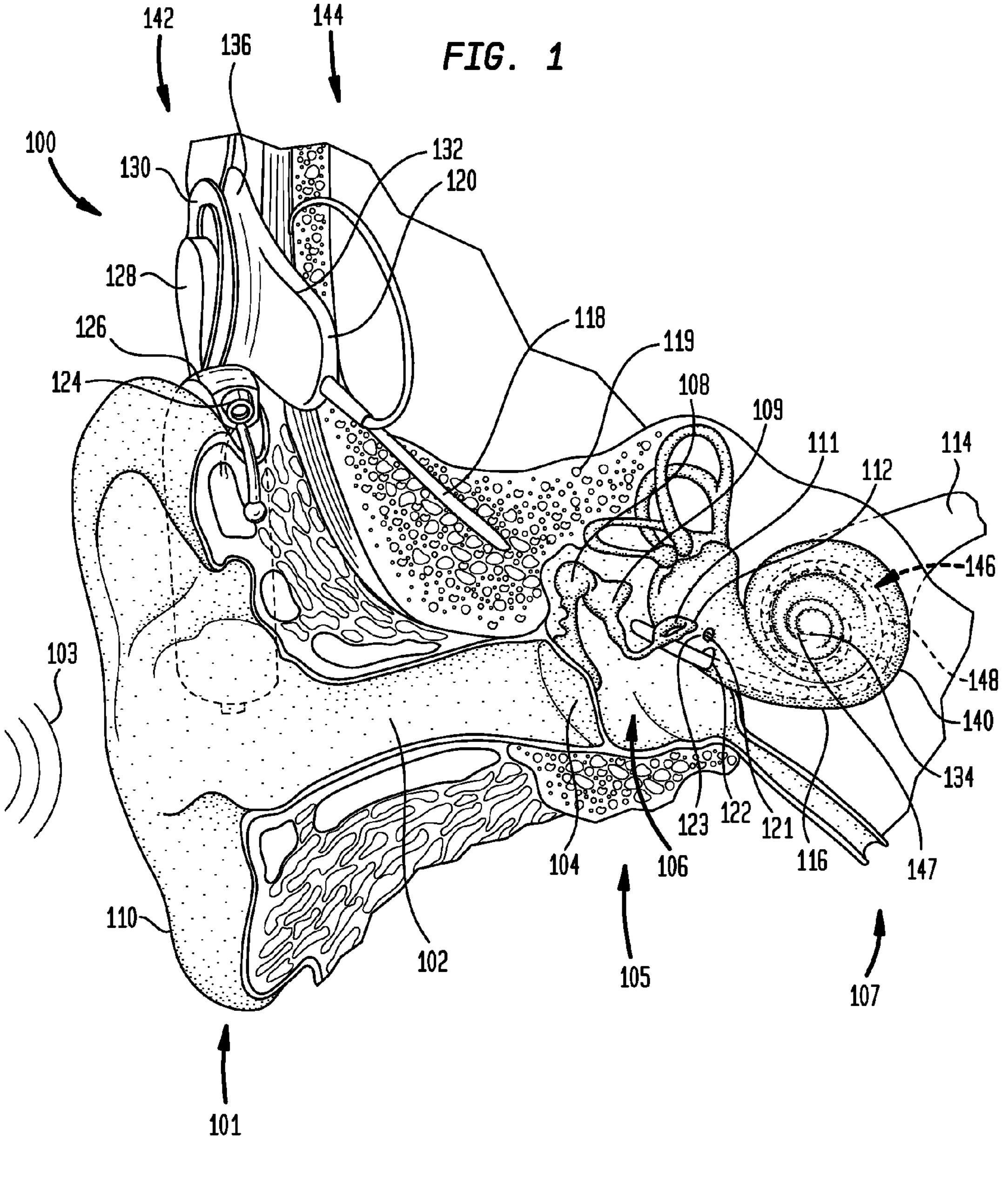
FIG. 1 is a partially schematic view of a cochlear implant, implanted in a recipient, in which embodiments of the present invention may be implemented.

Certain aspects of the present invention are generally directed to a system and/or method for noise reduction in a sound processing system. In the illustrative method, a sound signal, having both noise and desired components, is received as an electrical representation. At least one estimate of a noise component is generated based thereon. This estimate, referred to herein as a noise component estimate, is an estimate of one noise component of the received sound. Such noise component estimates may be generated from different sounds, different components of the sound, or generated using different methods.

The illustrative method in accordance with embodiments of the present invention further includes generating a measure that allows for objective or subjective verification of the accuracy of the noise component estimate. The measure, referred to herein as a confidence measure, allows for the determination of whether or not the noise component estimate is likely to be reliable. In embodiments of the present invention, the noise component estimate is based on one or more assumptions. In certain such embodiments, the confidence measure may provide an indication of the validity of such assumptions. In another embodiment, the confidence measure can indicate whether a noise component of the received sound (or the desired signal component) possesses characteristics which are well suited to the use of a given noise component estimation technique.

As described in greater detail below, the confidence measure is used during sound processing operations to convert the received electrical representation into an a usable. For example, in the specific example of hearing prosthesis, the output is usable for generating stimulation signals (acoustic, mechanical, electrical) for delivery to a recipient's ear. In certain embodiments, generating an estimate of a noise component may include, for example, generating a signal-to-noise ratio (SNR) estimate of the component.

The confidence measure may be used during processing for a number of different purposes. In certain embodiments of the present invention, the confidence level is used in a process that selects one of a plurality of signals for further processing and use in generating stimulation signals. In other embodiments, the confidence level is used to scale the effect of a noise reduction process based on a noise parameter estimate. In such embodiments, the confidence measure is used an indication of how well the noise parameter estimate is likely to reflect the actual noise parameter in the electrical representation of the sound. In specific such embodiments, a plurality of noise parameter estimates are generated and the confidence measure is used to choose which of the noise parameter estimates should be used in further processing.

The confidence measure may be generated using a number of different methods. In one embodiment, in a system with multiple input signals, the confidence measure is determined by comparing two or more of the input signals. In one example, a coherence between two input signals can be calculated. A statistical analysis of a signal (or signals) can be used as a basis for calculating a confidence measure.

Additionally, certain embodiments of the present invention are generally directed to a method of selecting which of a plurality of input signals should be selected for use in generating stimulation signals for delivery to a recipient via electrodes of an implantable electrode array. That is, embodiments of the present invention are directed to a channel selection method in which input signals are selected on the basis of the psychoacoustic importance of each spectral component, and one or more additional signal characteristics. In certain embodiments, the psychoacoustic importance for each spectral component is a speech importance weighting of the spectral component. The additional channel characteristics may be, for example, one or more of: channel energy, channel amplitude, a noise component estimate of an input signal (such as a noise or SNR estimate), a confidence measure associated with a noise component estimate, or the like. In certain embodiments, the channel selection method is part of an n of m channel selection strategy, or a strategy that select all channels fulfilling a predetermined channel selection criterion.

Still other aspects of the present invention are generally directed to a system and/or method that generates a signal-to-noise ratio (SNR) estimate on the basis of two or more independently derived SNR estimates. The SNR estimates are used to generate a noise reduced signal. In such embodiments, the independent SNR estimates can either be derived from different signals, using different SNR estimation techniques, or both different signals and different techniques. In certain embodiments, a system includes multiple microphones and each microphone may be used to generate an independent input signal. An SNR estimate can be generated for each input signal. In an alternative embodiment, input signals may be generated by combining the outputs of different subsets of microphones. If the inputs come from different sources, the same SNR estimation technique could be used for each input. However, if the input signals come from the same source, then different SNR techniques are needed to give independent estimates.

The process for generating an SNR estimate from the two or more independent SNR estimates can be performed in a number of ways, such as averaging more than one SNR estimate, choosing one of the multiple SNR estimates based on one or more criteria. For example, the highest or lowest SNR estimate could be selected. The SNR estimates may be derived using a conventional method, or derived using one of the novel SNR estimation techniques described elsewhere herein.

In some embodiments, an SNR estimate may be used in the processing of a frequency channel (either a frequency channel from which it has been derived, but possibly a different frequency channel) to generate an output signal having a reduced noise level. In one embodiment, this may include using the SNR estimate to perform noise reduction in the channel. In another embodiment the SNR estimate may, additionally or alternatively, be used as a component (or sole input in some cases) in a channel selection algorithm of cochlear implant. In yet another embodiment, the SNR estimate can, additionally or alternatively, be used to select an input signal to be used in either of the above processes.

The idea of producing a signal with reduced noise level in this specification includes conventional noise reduction as well as channel selection or rejection in nerve stimulation devices.

In another embodiment there is provided a method which uses a confidence measure in the combination or selection of SNR estimates. In one form, the method uses a single confidence measure to reject a corresponding SNR estimate. Other embodiments may be implemented in which each SNR estimate has an associated confidence measure that is used for combining the SNR estimates, by performing a weighted sum or other combination technique.

In one embodiment, two SNR estimates are generated for each input signal. The two SNR estimates include one assumptions-based SNR estimate and one statistical model-based SNR estimate. Most preferably the assumptions-based SNR estimate is based on a directional assumption about the noise or signal and the statistical model-based SNR estimate is non-directional. In some circumstances the statistical model-based estimate will provide a more reliable estimate of SNR (e.g. circumstances with stationary noise) and in other circumstances the assumptions-based SNR estimate will work well (e.g. in circumstances where the assumptions on which the SNR estimate hold). A confidence measure for each SNR estimate can be used to determine which SNR estimate should be used in further processing of the input signal. The selection of the SNR estimate with the best confidence measure allows this embodiment to the changing circumstances.

In another embodiment an SNR estimate can be used in a channel selection process in a nerve stimulation device. In certain embodiments, a so called n of m channel selection strategy is performed. In this process up to n channels are selected for continued processing from the possible m channels available, on the basis of an SNR estimate.

In some embodiments a combination of an SNR estimate and one or more additional channel based criteria, including but not limited to, speech importance, amplitude, masking effects, can be used for channel selection.

In an additional aspect there is provided an method of performing a statistical model-based noise estimation. The method uses an analysis window which varies with channel frequency when determining channel statistics. In a preferred form a short analysis window is used for high frequency channels and longer analysis windows for lower frequency channels.

In an additional aspect there is provided an assumptions-based SNR estimation method. This SNR estimation method is based on assumptions about the spatial distribution of certain components of a received sound.

For a received sound signal one or more spatial fields are defined e.g. by filtering inputs from an array of omnidirectional microphones or using directional microphones. The spatial fields can then be defined as either being "signal" or "noise" and SNR estimates calculated. In a preferred form it is assumed that a desired signal will originate from in front of a user, and noise will originate from either behind or areas other than in front of the user. In this case the front and rear spatial components can be used to derive a SNR estimate, by dividing the front spatial component by the rear spatial component.

Monaural or binaural implementations are possible. In one binaural implementation, a common "noise" component is used for calculating both the left and right side SNR estimates. In this case, each of the left and right channels maintain separate front facing signal components.

In another aspect, there is provided a method of compensating or correcting noise estimates in a sound processing system. In this method a frequency dependent compensation factor is generated by applying a calibration sound with equal (or at least known) energy (signal and noise) in each frequency channel. The outputs of the noise estimation process at a plurality of frequencies are analyzed and correction factor is determined for each channel that, when applied, will cause the noise or SNR estimates to be substantially equal (or correctly proportioned if a non-equal calibration signal is used).

In yet another aspect, there is provided a noise reduction process. The noise reduction process includes, applying a gain to the signal to at least partially cancel a noise component therein. The gain value applied to the signal is selected from a gain curve that varies with SNR.

In one form the gain function is a binary mask, which applies a gain of 0 for signals with an SNR worse than a preset threshold, and a gain of 1 for SNR better than the threshold. The threshold SNR level is preferably above 0 dB.

Alternatively a smooth gain curve can be used. Such gain curves can be represented by parametric Weiner function. In a preferred form the gain curve has an absolute threshold (or −3 dB knee point) at around 5 dB or higher.

In a preferred form used in cochlear implants, a gain curve that has any section which lies between a parametric Wiener gain function parameter values of $\alpha$=0.12 and $\beta$=20, and a parametric Wiener gain function parameter values of $\alpha$=1 and $\beta$=20, over the range of instantaneous SNRs between the −5 and 20 dB instantaneous SNR range is suitable. In some cases substantial portion of the gain curve for a region between the −5 and 20 dB instantaneous SNR levels lies within the parametric Weiner gain functions noted above. A majority, or all, of the gain curve used can lie in the specified region.

If the SNR estimate has an associated confidence measure, the confidence measure can be used to modify the application of gain to the signal. Preferably, if the SNR estimate has a low confidence measure the level of gain application is reduced (possibly to 1, ie, the signal is not attenuated), but if the confidence measure related to the SNR estimate is high, the noise reduction is performed.

In another aspect a signal selection process can be performed prior to either noise reduction or channel selection as described above.

In some embodiments a sound processing system can generate multiple signals which could be used for further sound processing, for example, a raw input signal or spatially limited signal generated from one or more raw input signals. In the case where the assumptions underpinning the generation of a spatially limited signal hold, the spatially limited signal is already noise reduced, because it is limited to including sound arriving from a direction which corresponds to an expected position of a wanted sound. In contrast, in certain environments, e.g. places with echoes, the spatially limited signal will include noise. Thus the process includes selecting a signal, from the available signals, for further processing. The selection is preferably based on a confidence measure associated with an SNR estimate related to one or more of the available signals.

Illustrative embodiments of the present invention will be described with reference to one type of processing system, a hearing prosthesis referred to as a cochlear implant. However, it would be appreciated that embodiments of the present invention are applicable to sound processing systems in general, and thus may be implemented in other hearing prosthesis or other sound processing systems.

FIG. 1 is a schematic view of a cochlear implant 100, implanted in a recipient having an outer ear 101, a middle ear 105 and an inner ear 107. Components of outer ear 101, middle ear 105 and inner ear 107 are described below, followed by a description of cochlear implant 100.

In a fully functional ear, outer ear 101 comprises an auricle 110 and an ear canal 102. An acoustic pressure or sound wave 103 is collected by auricle 110 and is channelled into and through ear canal 102. Disposed across the distal end of ear cannel 102 is the tympanic membrane 104 which vibrates in response to the sound wave 103. This vibration is coupled to oval window or fenestra ovalis 112 through three bones of middle ear 105, collectively referred to as the ossicles 106 and comprising the malleus 108, the incus 109 and the stapes 111. Bones 108, 109 and 111 of middle ear 105 serve to filter and amplify sound wave 103, causing oval window 112 to articulate, or vibrate in response to vibration of tympanic membrane 104. This vibration sets up waves of fluid motion of the perilymph within cochlea 140. Such fluid motion, in turn, activates tiny hair cells (not shown) inside of cochlea 140. Activation of the hair cells causes appropriate nerve impulses to be generated and transferred through the spiral ganglion cells (not shown) and auditory nerve 114 to the brain (also not shown) where they are perceived as sound.

Cochlear implant 100 comprises an external component 142 which is directly or indirectly attached to the body of the recipient, and an internal component 144 which is temporarily or permanently implanted in the recipient. External component 142 typically comprises one or more sound input elements, such as microphone 124 for detecting sound, a sound processing unit 126, a power source (not shown), and an external transmitter unit 128. External transmitter unit 128 comprises an external coil 130 and, preferably, a magnet (not shown) secured directly or indirectly to external coil 130. Sound processing unit 126 processes the output of microphone 124 that is positioned, in the depicted embodiment, adjacent to the auricle 110 of the user. Sound processing unit 126 generates encoded signals, which are provided to external transmitter unit 128 via a cable (not shown).

Internal component 144 comprises an internal receiver unit 132, a stimulator unit 120, and an elongate electrode assembly 118. Internal receiver unit 132 comprises an internal coil 136, and preferably, a magnet (also not shown) fixed relative to the internal coil. Internal receiver unit 132 and stimulator unit 120 are hermetically sealed within a biocompatible housing, sometimes collectively referred to as a stimulator/receiver unit. The internal coil receives power and stimulation data from external coil 130, as noted above. Elongate electrode assembly 118 has a proximal end connected to stimulator unit 120, and a distal end implanted in cochlea 140. Electrode assembly 118 extends from stimulator unit 120 to cochlea 140 through the mastoid bone 119, and is implanted into cochlea 140. In some embodiments electrode assembly 118 may be implanted at least in basal region 116, and sometimes further. For example, electrode assembly 118 may extend towards apical end of cochlea 140, referred to as the cochlear apex 134. In certain circumstances, electrode assembly 118 may be inserted into cochlea 140 via a cochleostomy 122. In other circumstances, a cochleostomy may be formed through round window 121, oval window 112, the promontory 123 or through an apical turn 147 of cochlea 140.

Electrode assembly 118 comprises an electrode array 146 including a series of longitudinally aligned and distally extending electrodes 148, disposed along a length thereof. Although electrode array 146 may be disposed on electrode assembly 118, in most practical applications, electrode array 146 is integrated into electrode assembly 118. As such, electrode array 146 is referred to herein as being disposed in electrode assembly 118. Stimulator unit 120 generates stimulation signals which are applied by electrodes 148 to cochlea 140, thereby stimulating auditory nerve 114.

Because the cochlea is tonotopically mapped, that is, partitioned into regions each responsive to stimulus signals in a particular frequency range, each electrode of the implantable electrode array 146 delivers a stimulating signal to a particular region of the cochlea. In the conversion of sound to electrical stimulation, frequencies are allocated to individual electrodes of the electrode assembly. This enables the hearing prosthesis to deliver electrical stimulation to auditory nerve fibers, thereby allowing the brain to perceive hearing sensations resembling natural hearing sensations. In achieving this, processing channels of the sound processing unit 126, that is, specific frequency bands with their associated signal processing paths, are mapped to a set of one or more electrodes to stimulate a desired nerve fiber or nerve region of the cochlea. Such sets of one or more electrodes for use in stimulation are referred to herein as "electrode channels" or "stimulation channels."

In cochlear implant 100, external coil 130 transmits electrical signals (i.e., power and stimulation data) to internal coil 136 via a radio frequency (RF) link. Internal coil 136 is typically a wire antenna coil comprised of multiple turns of electrically insulated single-strand or multi-strand platinum or gold wire. The electrical insulation of internal coil 136 is provided by a flexible silicone molding (not shown). In use, implantable receiver unit 132 maybe positioned in a recess of the temporal bone adjacent auricle 110 of the recipient.

FIG. 1 illustrates a monaural system. That is, implant 100 is implanted adjacent to, and only stimulates one of the recipient's ear. However, cochlear implant 100 may also be used in a bilateral implant system comprising two implants, one adjacent each of the recipient's ears. In such an arrangement, each of the cochlear implants may operate independently of one another, or may communicate with one another using a either wireless or a wired connection so as to deliver joint stimulation to the recipient.

As will be appreciated, embodiments of the present invention may be implemented in a mostly or fully implantable hearing prosthesis, bone conduction device, middle ear implant, hearing aid, or other prosthesis that provides acoustic, mechanical, optical, and/or electrical stimulation to an element of a recipient's ear. Moreover, embodiments of the present invention may also be implemented in voice recognition systems or sound processing codec used in, for example, telecommunications devices such as mobile telephones or the like.

Figure 2A:
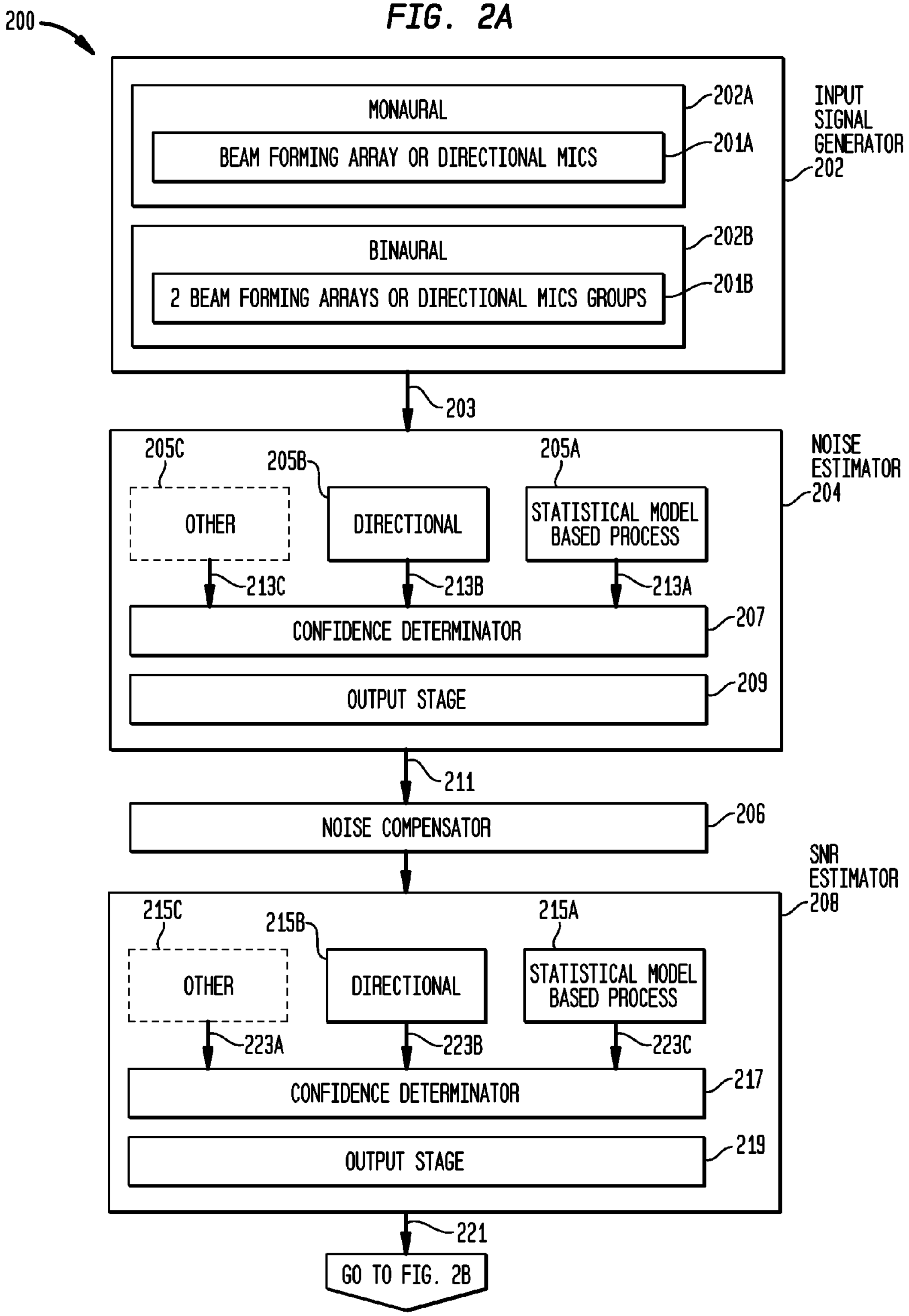
FIGS. 2A and 2B are, in combination, a functional block diagram illustrating embodiments of the present invention.
Figure 2B:
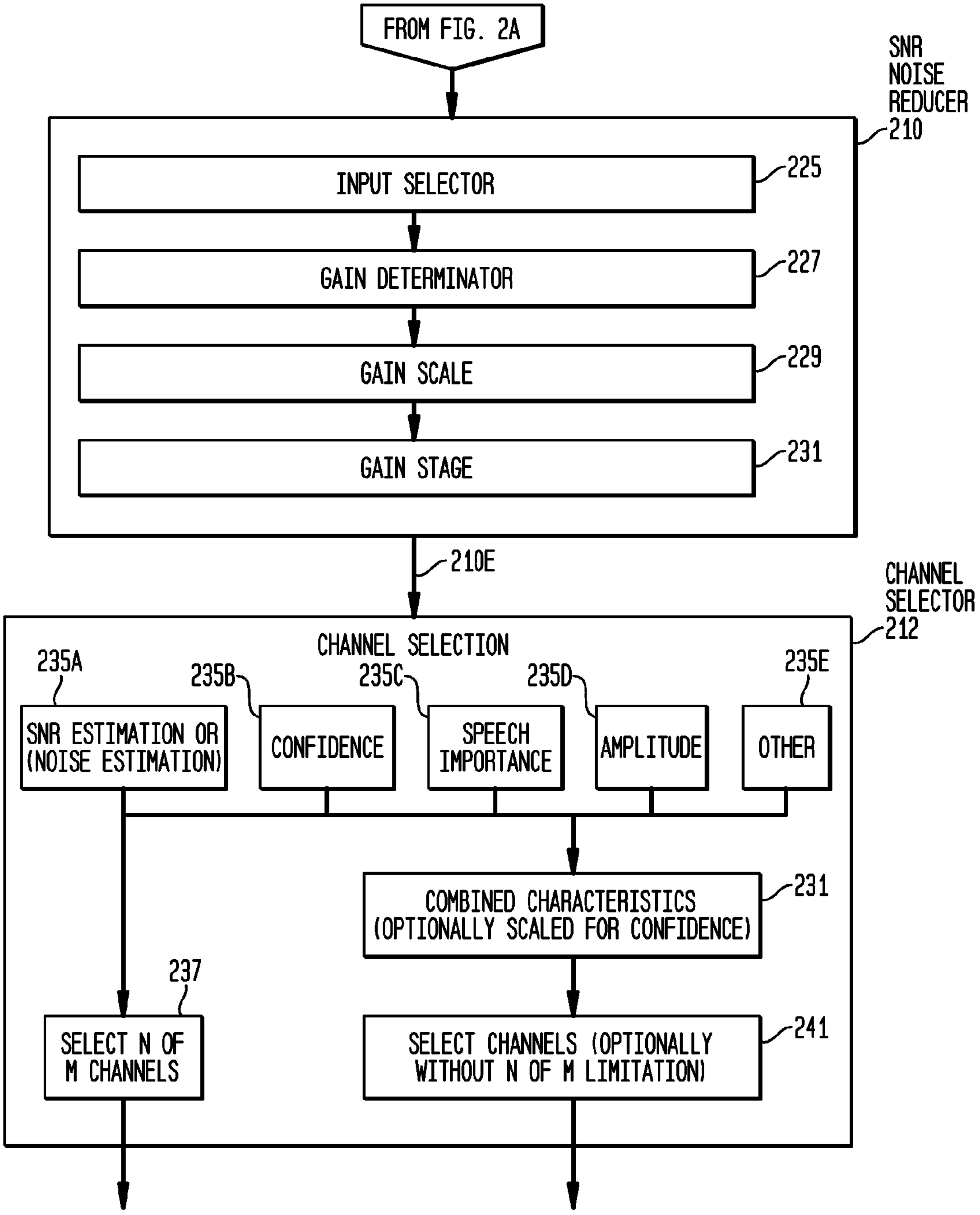

FIGS. 2A and 2B are, collectively, a functional block diagram of a sound processing system 200 in accordance with embodiments of the present invention. System 200 is configured to receive an input sound signal and to output a modified signal representing the sound that has improved noise characteristics. As shown in FIG. 2A, system 200 includes a first block, referred to as input signal generation block 202. Input signal generation block 202 implements a process in electrical signals 203 representing a sound are received and/or generated. Shown in block 202 of FIG. 2A are different exemplary implementations for the input signal generation block. In one such implementation, a monaural signal generation system 202A is implemented in which electrical signal(s) 203 represent the sound at a single point, but do not necessarily use a single input signal. In one monaural implementation, a plurality of input signals are generated using an array of omnidirectional microphones, as shown in block 201A. The input signals from the array of microphones are used to determine directional characteristics of the received sound.

FIG. 2A also illustrates another possible implementation for input signal generator 202, shown as binaural signal generation system 202B. Binaural signal generation system 202B generates electrical signals 203 representing sound at two points, so as to represent sound received at each side of a persons head. In one form, as illustrated by block 201B, a pair of omnidirectional microphone arrays, such as a beam former or directional microphone groups, may be used to generate two sets of input signals that include directional information regarding the received sound.

In embodiments of the present invention, the primary input to input signal generator 202 will be the electrical outputs of one or more microphones that receive an acoustic sound signal. However, other types of transducers, such as a telecoils (T-mode input), or other inputs may also be used. In implementations that are used to provide hearing assistance to a recipient of a cochlear implant or other hearing prosthesis, the input signal may be delivered via a separate electronic device such as a telephone, computer, media player, other sound reproduction device, or a receiver adapted to receive data representing sound signals e.g. via electromagnetic waves. An exemplary input signal generator 202 is described further below with reference to FIG. 3.

As shown in FIG. 2A, system 200 also includes a noise estimator 204 that is configured to generate a noise estimate of input signal(s) 203 received from block 202. In embodiments of the present invention, the noise estimate is generated based on a plurality of noise component estimates. Such parameter noise estimates are, in this exemplary arrangement, generated by noise component estimators 205 and the estimates may be independent from one another as they are, for example, created from different input signals, different input signal components, or generated using different mechanisms.

As shown, noise estimator 204 includes three noise component estimators 205. A first noise component estimator 205A uses a statistical model based process to create at least one noise component estimate 213A. A second noise component estimator 205B creates a second noise component estimate 213B on the basis of a set of assumptions of, for example, such as the directionality of the sound received. Other noise estimates 213C may additionally be generated by noise component estimator 205C.

Noise estimator 204 also includes a confidence determinator 207. Confidence determinator 207 generates at least one confidence measure for one or more of the noise component estimates generated in blocks 205. A confidence measure may be determined for each of the noise estimates 213 or, in some embodiments, a single confidence measure for one of the noise estimates could be generated. A single confidence measure may used in, for example, a system where only two noise estimates are derived.

The confidence measure(s) are processed, along with the noise estimate and a corresponding input signal. For example, the confidence measure(s) for one or more of the noise estimates can be used to create a combined noise estimate that is used in later processing, as described below. Additionally, a confidence value for one or more noise estimates could be used to select or scale an input signal during later processing. In this case the confidence measure may be viewed as an indication of how well the noise component estimate is likely to reflect the actual noise component of the signal representing the sound. In some embodiments, a plurality of noise component estimates can be made for each signal. In this case the confidence measure can be used to choose which of the noise component estimates to be used in further processing or to combine the plurality of noise component estimates into a single, combined noise component estimate for the signal.

The confidence measure is calculated to reflect whether or not a noise component estimate is likely to be reliable. In one embodiment the confidence measure can indicate the extent to which an assumption on which a noise parameter estimate is based holds. In another embodiment, the confidence measure can indicate whether a noise parameter of a sound (or desired signal component) possesses characteristics which are well suited to the use of a given noise parameter estimation technique. In a system with multiple input signals, the confidence measure can be determined by comparing two or more of the input signals. In one example, a coherence between two input signals can be calculated. A statistical analysis of a signal (or signals) can be used as a basis for calculating a confidence measure.

Noise estimator 204 also includes an estimate output stage 209 in which a plurality of noise estimates are processed to determine a final noise estimate 211. Stage 209 generates the final output by, for example, combining the noise component estimates or selecting a preferred noise estimate from the group. Noise estimation within noise estimator 204 may be performed on a frequency-by-frequency basis, a channel-by-channel basis, or on a more global basis, such as across the entire frequency spectrum of one or a group of input signals.

System 200 also includes a noise compensator 206 that compensates for systematic over or under or, estimation of one or more of the noise estimation processes performed by noise estimator 204. Additionally, system 200 includes a signal-to-noise (SNR) estimator 208. SNR estimator 208 operates similar to block 204, but instead of generating noise estimates, SNR estimates are generated. In this regard, SNR estimator 208 includes a plurality of component SNR estimators 215. SNR estimators 215 may operate by processing a signal estimate with a corresponding noise estimate generated by a corresponding noise estimation block 205 described above. Each of the generated SNR estimates 223 may be provided to confidence determinator 217 for an associated confidence measure calculation. The confidence measure for an SNR estimate can be the confidence measure from a noise estimate corresponding to the SNR estimate or a newly generated estimate. As with the noise estimator 204, the SNR estimator 208 may include an output stage 219 in which a single SNR estimate 221 is generated from the one or more SNR estimates generated in blocks 215.

As shown in FIG. 2B, system 200 also includes an SNR noise reducer 210. SNR reducer 210 is a signal-to-noise ratio (SNR) based noise reduction block that receives an input signal representing a sound or sound component, and produces a noise reduced output signal. SNR noise reducer 210 optionally includes an initial input selector 225 that selects an input signal from a plurality of potential input signals. More specifically, either a raw input signal (e.g. a largely unprocessed signal derived from a transducer of input signal generation stage 202) is selected, or an alternative pre-processed signal component is selected. For example, in some instances a pre-processed, filtered input signal is available. In this case, it may be advantageous to use this pre-processed signal as a starting point for further noise reduction, rather than using a noisier, unfiltered raw signal. The selection of input signals by selector 225 may be based on one or more confidence measures generated in blocks 205 or 215 described above.

SNR reducer 210 also includes a gain determinator 227 that uses a predefined gain curve to determine a gain level to be applied to an input signal, or spectral component of the signal. Optionally, the application of the gain curve can be adjusted in by gain scaler 229 based on, for example, a confidence measure corresponding to either a SNR or noise value of the corresponding signal component. Next, gain stage 231 applies the gain to the signal input to generate a noise reduced output 233.

System 200 also includes a channel selector 212 that is implemented in hearing prosthesis, such as cochlear implants, that use different channels to stimulate a recipient. Channel selector 212 processes a plurality of channels, and selects a subset of the channels that are to be used to stimulate the recipient. For example, channel selector 212 selects up to a maximum of N from a possible M channels for stimulation.

The utilized channels may be selected based on a number of different factors. In one embodiment, channels are selected on the basis of an SNR estimate 235A. In other embodiments, SNR estimate 235 may be combined at stage 239 with one or more additional channel criteria, such as a confidence measure 235B, a speech importance function 235C, an amplitude value 235D, or some other channel criteria 235E. In certain embodiments, the combined values may be used in stage 241 for selecting channels. The channel selection process performed at stage 239 may implement an N of M selection strategy, but may more generally be used to select channels without the limitation of always selecting up to a maximum of N out of the available M channels for stimulation. As will be appreciated, channel selector 212 may not be required in a non-nerve stimulation implementation, such as a hearing aid, telecommunications device or other sound processing device.

As such, embodiments of the present invention are directed to a noise cancellation system and method for use in hearing prosthesis such as cochlear implant. The system/ method uses a plurality of signal-to-noise-Ratio (SNR) estimates of the incoming signal. These SNR estimates are used either individually or combined (e.g., on a frequency-by-frequency basis, channel by channel basis or globally) to produce a noise reduced signal for use in a stimulation strategy for the cochlear implant. Additionally, each SNR estimate has a confidence measure associated with it, that may either be used in SNR estimate combination or selection, and may additionally be used in a modified stimulation strategy.

Figure 3:
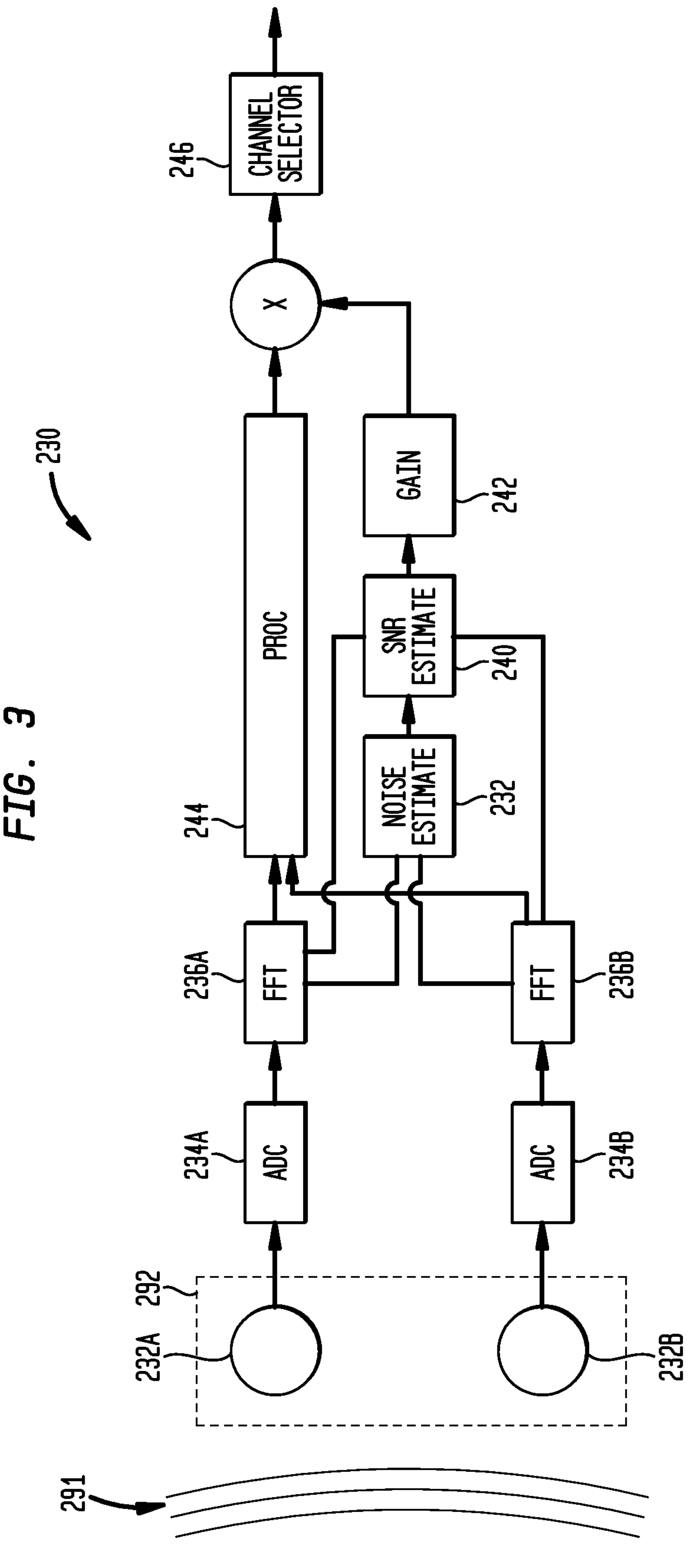
FIG. 3 is a schematic block diagram of a sound processing system, in accordance with embodiments of the present invention.

FIG. 3 is a schematic block diagram of a sound processing system 230 that may be used in a cochlear implant. Sound processing system 230 receives a sound signal 291 at a microphone array 292 comprised of a plurality of microphones 232. The output from each microphone 232 is an electrical signal representing the received sound signal 291, and is passed to a respective analog to digital converter (ADC) 234 where it is digitally sampled. The samples from each ADC 234 are buffered with some overlap and then windowed prior to conversion to a frequency domain signal by Fast Fourier Transform (FFT) stage 236. The frequency domain conversion may be performed using a wide variety of mechanisms including, but not limited to, a Discrete Fourier Transform (DFT). FFT stages 236 generate complex valued frequency domain representations of each of the input signals in a plurality of frequency bins. The FFT bins may then be combined using, for example, power summation, to provide the required number of frequency channels to be processed by system 230. In the embodiments of FIG. 3, the sampling rate of an ADC 234 is typically around 16 kHz, and the output is buffered in a 128 sample buffer with a 96 sample overlap. The windowing is performed using a 128 sample Hanning window and a 128 sample fast Fourier transform is performed. As will be appreciated, the microphones 232A, 232B, ADCs 234A, 234B and FFT stages 236A, 236B thus correspond to input signal generator 202 of FIG. 2.

In accordance with certain embodiments of the present invention, sound processing system 230 may, for example, form part of a signal processing chain of a Nucleus® cochlear implant, produced by Cochlear Limited. In this illustrative implementation, the outputs from FFT stages 236A, 236B will be summed to provide 22 frequency channels which correspond to the 22 stimulation electrodes of the Nucleus® cochlear implant.

The outputs from the two FFT stages 236A, 236B are passed to a noise estimation stage 238, and a signal-to-noise ratio (SNR) estimator 240. In turn, the SNR estimator 240 will pass an output to a gain stage 242 whose output will be combined with the output of processor 244 prior to downstream channel selection by the channel selector 246. The output of the channel selector 246 can then be provided to a receiver/stimulator of an implanted device e.g. device 132 of FIG. 1 for applying a stimulation to the electrodes of a cochlear implant.

Figure 4:
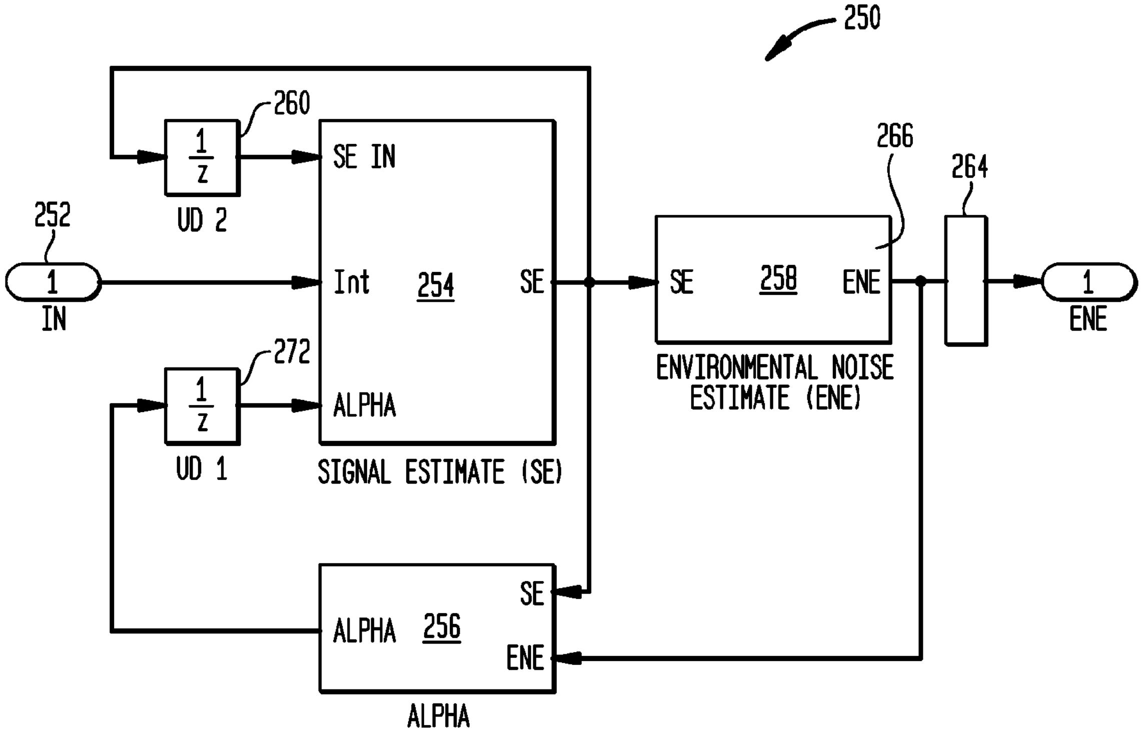
FIG. 4 schematically illustrates a noise estimator, in accordance with embodiments of the present invention.

As noted above with reference to FIG. 2A, embodiments of the present invention include a noise estimator having a plurality of noise component estimators 203. FIG. 4 illustrates an exemplary embodiment of a noise component estimator 205A from FIG. 2A that useable in an embodiment to generate a noise estimate. Component noise estimator 250 of FIG. 4 uses a statistical model based approach to noise estimation, such as a minimum statistics method, to calculate an environmental noise estimate from its input signal. The Environmental Noise Estimate (ENE) can be generated on a bin-by-bin level or on a channel-by-channel basis. When used with a system such that generates multiple output signals representing the same sound signal (i.e. FIG. 3 in which one signal is generated from each microphone), it is typically only necessary to perform noise estimation on a signal derived from one of the microphones of the array 232. However, ENEs for each input signal may be separately generated, if required. Thus, for the present example, it is assumed that the input signal 252 to component noise estimator 250 is the output from FFT block 236A, illustrated in FIG. 3.

In component noise estimator 250, a minimum statistics algorithm is used to determine the environmental noise power on each channel through a recursive assessment of input signal 252. The statistical model based noise estimator 250 used in this example includes three main sub blocks:

1. A signal estimator 254 which uses a varying proportion of the current channel (In1) value and previous signal estimates (SE) to calculate the current signal estimate (SE);
2. A feedback block 256 that calculates a value (α) Alpha using an equation based on the current signal estimate (SE) and current noise estimate (ENE) as follows:

$$\alpha = \frac{1}{\left(\frac{SE}{ENE} - 1\right)^2 + 1}$$

where:

α is a smoothing parameter and is constrained to be between 0.25 and 0.98;

SE is the Signal Estimate; and

ENE is the environmental noise estimate.

3. A noise estimator 258, that calculates the environmental noise estimate (ENE) 266 of the input signal 252 by finding a minimum signal estimate over an analysis window including a group of previous FFT frames.

In use, the current signal estimate, SE that is output from signal estimator 254 is fed back to the input (SE in) of signal estimation block 254 via a unit delay block 260. Similarly, value alpha (α), from block 256, is passed back to the input (Alpha) of signal estimator 254 via a unit delay block 262. Thus, the signal estimate input (SE in) and Alpha inputs to the signal estimator 254 are from a previous time period.

In certain embodiments of the present invention, the statistics based noise estimation process described in connection with FIG. 4 is performed on a "per channel" or "per frequency" basis. The inventors have determined that it is advantageous, when generating a statistical model based noise estimate, for a relatively short analysis window (approximately 0.5 seconds but possibly down to 0.1 seconds) to be used when calculating noise statistics for high frequency channels. However, for lower frequency channels, longer analysis windows (approximately 1.2 seconds but possibly up to 5 or more seconds) may be used. The length of the analysis window may be determined on the basis of the central frequency of the channel (or frequency band) and may be longer or shorter than the time detailed above.

Following noise estimation, it may be necessary to compensate the noise estimates in some frequency bands to correct for systematic errors. To this end the noise estimator 250 can be followed by a bias compensation block 264 that corresponds to noise compensator 206 described above with reference to FIG. 2. Block 264 scales noise estimates 266 that are output from noise estimator 258 to correct for systematic error. For example it may be found that the noise estimate in some channels is either consistently underestimated or overestimated compared to the longer term noise average.

Bias compensation block 264 applies a frequency dependent bias factor to scale the ENE value 266 at each frequency. In order to calibrate the biasing gain applied by the block 264, white noise is provided as an input signal 252 to the system 250, and the output ENE 266 values are recorded for each frequency band. The ENE value 266 in each frequency band is then biased so that in each band the average of the white noise applied is estimated. These calibration biasing factors are then stored for future use.

The noise estimate generated using this statistical model based approach can also be used in a subsequent SNR estimation process (such as is described above with reference to SNR estimator 208 of FIG. 2) to generate a statistical-model based SNR estimate, as follows.

For each channel or frequency band, a signal-to-noise ratio is able to be calculated from the estimate of environmental noise (ENE) and the input signal (SIG) itself using the equations below:

$$SNR = \frac{signal^2}{noise^2}$$

If the estimate of the noise is assumed to be the actual noise floor, then $$ENE = noise^2$$

and, $$SNR = \frac{signal^2}{ENE}$$

Accordingly the SNR can be calculated from the input signal (SIG), which equals $(\text{signal+noise})^2$ and the ENE, by $$SNR = \begin{cases} \frac{SIG}{ENE} - 1, & \text{if } \frac{SIG}{ENE} \geq 1 \\ 0, & \text{Otherwise} \end{cases}$$

where:

SIG is the input signal to the system; and

ENE is the environmental noise estimate.

Accordingly, using the processing system of FIG. 4, noise estimates can be calculated from a single signal input using a statistical method. Advantageously, the estimate of SNR derived from this noise estimate does not use any prior knowledge of the true noise or signal characteristics. Embodiments may perform well with non transient, frequency limited or white noise and the method is generally not sensitive to directional sounds and competing noise. Moreover, such a SNR estimation process is expected to operate in, but not limited to, the range of approximately 0 to approximately 10 dB SNR range.

As described above with reference to confidence determinator 207 of FIG. 2, it is possible to determine an associated confidence measure for a noise component estimate. A confidence measure for the statistical model based noise estimate described above may be derived through monitoring the value alpha (α), ENE and input signal (SIG) 252. When alpha is low (e.g., less than about 0.3), it can be assumed that there is little, or no, target signal present and that the signal is only noise. If alpha remains low beyond a threshold time period, a confidence measure can be calculated by finding a mean of the input signal and standard deviation of the input signal 252 using the equation set out below. Although this example assumes a Gaussian noise distribution, other distributions may also be used and provide a better confidence measure.

$$conf = \frac{1}{k \times stdev(SIG_{dB} - ENE_{dB}) + 1}$$

where:

conf is the confidence measure of the associated noise or SNR estimate;

$SIG_{dB}$ is the signal during periods of predominantly noise;

$ENE_{dB}$ is the environmental noise estimate during periods of predominantly noise; and k is a pre defined constant that can be used to vary system sensitivity by scaling the confidence value.

When the confidence measure (conf) is high, (i.e., close to 1), then the statistics based noise estimate is providing a good estimate of the noise level. If conf is low, (i.e., close to 0) then the statistics bases noise estimate is providing a poor estimate of the noise level.

Such a confidence calculation can be performed on the noise estimate for each frequency band or channel. However, in certain embodiments, the confidence measure for multiple channels can be combined to provide an overall confidence measure for whole noise or SNR estimation mechanism. Combination of the confidence measures of several channels may be performed by multiplying the channel confidence values for each the group of channels together, or through some other mechanism, such as averaging.

The SNR estimate generated from the statistical-model-based method may also have a confidence measure associated with it either by assigning it the confidence measure associated with its corresponding noise estimation, or by calculating a separate value.

As noted above with reference to FIG. 2A, noise estimator 204 and SNR estimator 208 the noise estimation block 204 and/or SNR estimation block 208 typically generate at least two or more independent noise component and/or SNR estimates. In one embodiment, a second noise and SNR estimation may be determined on the basis of an assumption about a characteristic of the received sound, or the sources of the sound.

Further embodiments of the present invention are described below. The first embodiment, described with reference to FIGS. 5-7, relates to a monaural system that includes multiple sound inputs, such as a plurality of microphones in a microphone array. The second embodiment, described with reference to FIGS. 8 and 9, relates to a binaural system.

Figure 5:
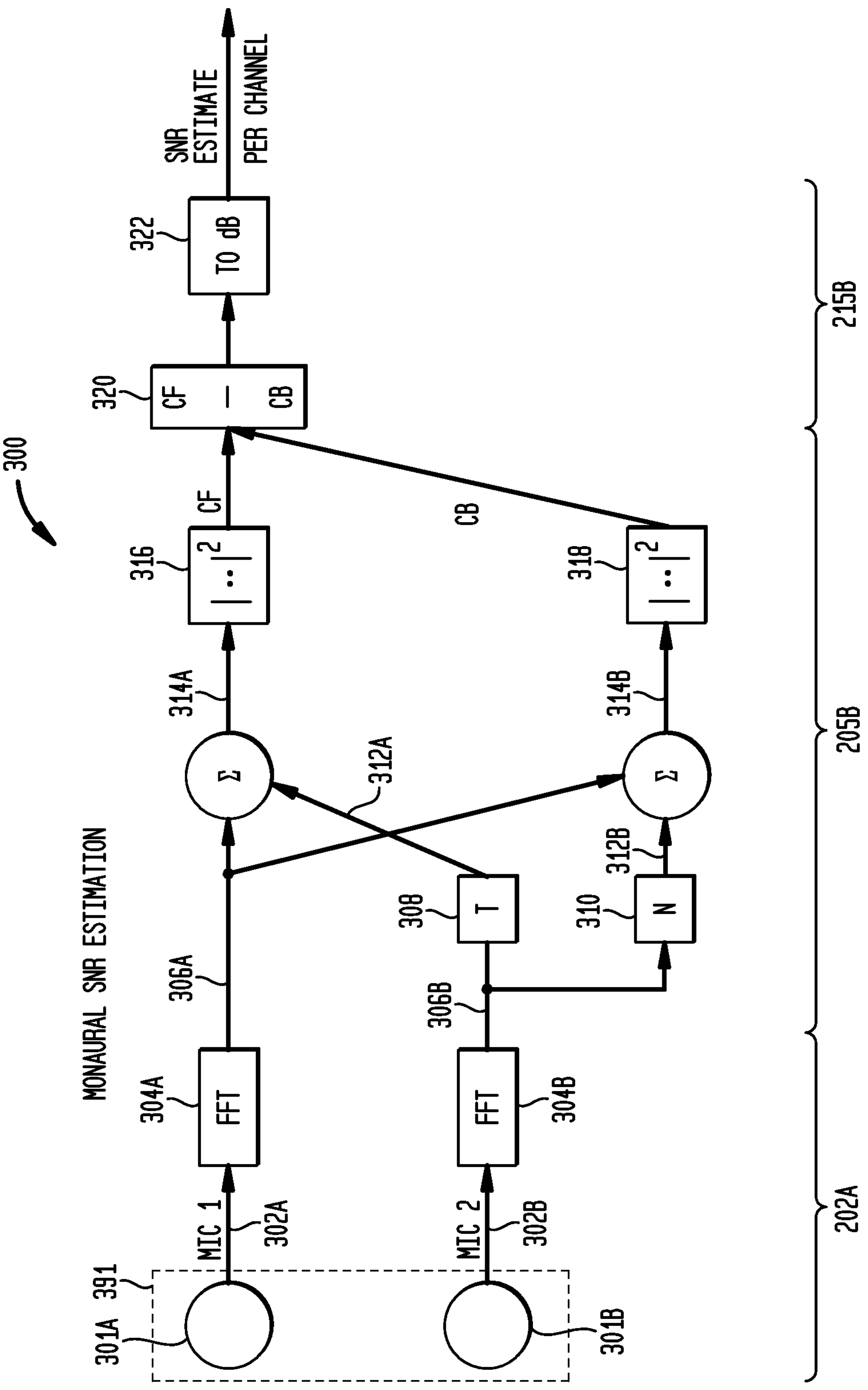
FIG. 5 schematically illustrates a first example of a signal-to-noise ratio (SNR) estimator, in accordance with embodiments of the present invention.

FIG. 5 illustrates an exemplary SNR estimator subsystem that is configured to generate two noise component estimates and two SNR estimates. As noted above, the first estimate is generated using a statistical model based approach to noise estimation. However, the second noise estimate and SNR estimate are each based on an underlying assumption that the received sound has certain spatial characteristics and either, one or both of the wanted signal (e.g. speech) and/or noise that is present in the audio signal, may be isolated using these spatial characteristics. For example, if the system is optimized so as to provide good performance for conversations, it might be assumed that the desired signal (i.e. speech) is received from directly in front of the recipient, whereas any sound received from behind the recipient represents noise. Other scenarios will have other spatial characteristics and other directional tuning may be desirable. The SNR estimator 300 of FIG. 5 provide examples of the following blocks illustrated in FIG. 2: using an array of microphones as described with reference to 201A; generating assumptions based noise estimate of 205B; generating an associated SNR estimate 215B; and generation of confidence determinations by determinators 207, 217.

The system 300 receives a sound signal at the omnidirectional microphones 301 of microphone array 391, and generates time domain analog signals 302. Each of the inputs 302 are converted to digital signals (e.g. using ADCs, such as ADCs 234 from FIG. 3), buffered, with some overlap, windowed and a spectral representation is produced by respective Fast Fourier Transform stages 304. As such, complex valued frequency domain representations 306 of the two input signals 302 are generated. The number of frequency bins used in this example may vary from the earlier signal-to-noise ratio (SNR) estimate example, but 65 bins is generally found to be acceptable. The outputs 306A and 306B from the FFT stages 304A, 304B are then used to generate polar response patterns. The polar response patterns are used to produce a directional signal.

Embodiments of the present invention are generally described in a manner that will optimize performance when sounds of interest arrive from the front of the recipient, such as in a typical conversation. Accordingly, in this case, the first polar response pattern is a front facing cardioid, which effectively cancels all signal contribution from behind. The second polar response pattern is a rear facing cardioid which effectively cancels all signal contribution from the front. These directional signals are directly used to represent the signal and noise components of a received sound signal. Alternatively, these directional signals may be averaged across multiple FFT frames so as to introduce smoothing over time into the signal and noise estimates.

Each polar response pattern is created from the input signal data 306A, 306B by applying a complex valued frequency domain filter (T,N) (308, 310) to one of the input signals. In this case, only the processed input 306B enters the filters 308, 310. The filtered outputs 312A, 312B are then subtracted from the unfiltered signal 306A of the other microphone.

Figure 6A:
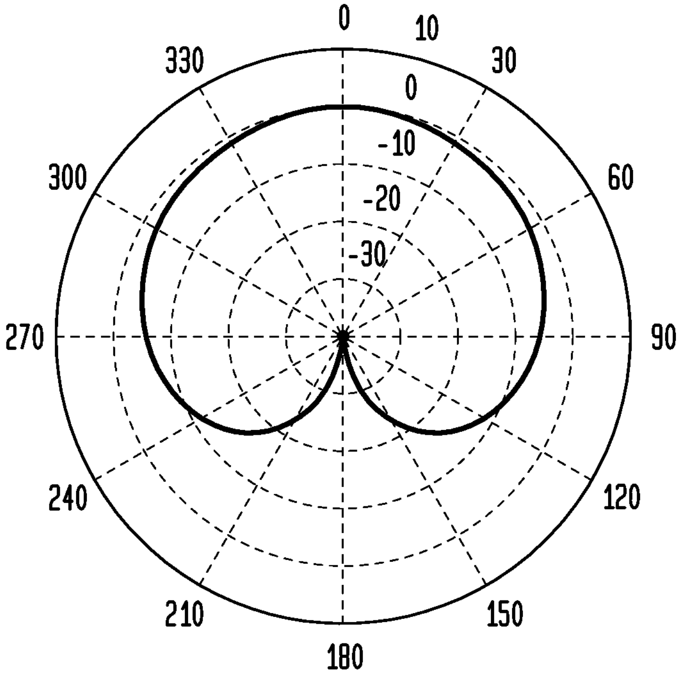
FIG. 6A illustrates a front facing cardioid associated with the SNR estimation of FIG. 5.
Figure 6B:
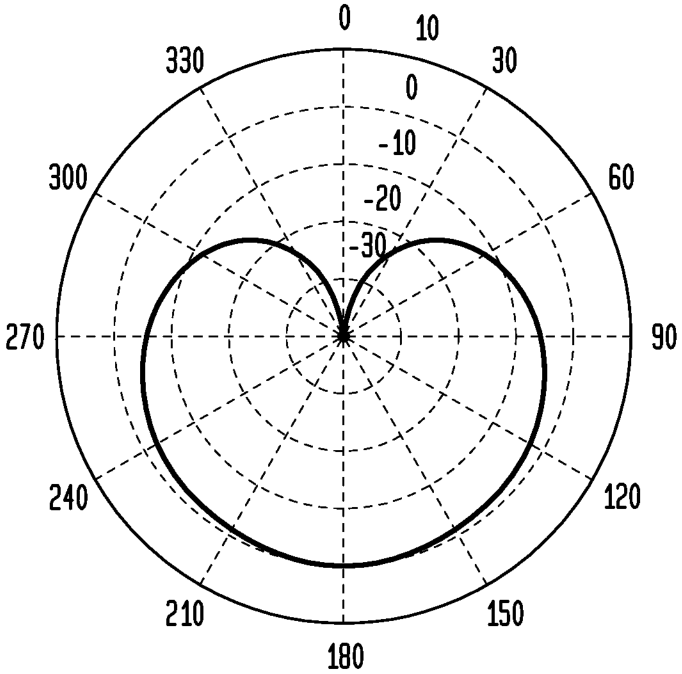
FIG. 6B illustrates a rear facing cardioid associated with the SNR estimation of FIG. 5.

The filter coefficients T and N of filters 308 and 310 respectively, are chosen to define the sensitivity of the front facing and rear facing cardioids. More specifically, the coefficients are chosen such that the front facing cardioid has maximum sensitivity to the forward direction and minimal sensitivity to the rear direction when the microphone array is worn by a user. The coefficients are shown such that the rear facing cardioid is the opposite, and has maximum sensitivity to the rear direction and minimum sensitivity to the front direction. FIG. 6A illustrates an exemplary front facing cardioid (cf), while FIG. 6B illustrates an exemplary rear facing cardioid (cb).

Returning to FIG. 5, the output 306B is filtered using filter T 308 and subtracted from the output 306A derived from microphone 301A. This summed output 314A is converted in block 316 to an energy value by summing the squared real and imaginary components of each bin to generate a value (cf) for each frequency bin. The value cf represents the energy in the front facing cardioid signal in each frequency bin.

The output 306B from FFT stage 304B is also passed to a second signal path and filtered by filter N 310, before being subtracted from the output 306A derived from the first microphone 301A. This signal 314B is converted to an energy value in block 318, by squaring the real and imaginary components in each bin and summing them. This generates an output value (cb). Because of the assumptions on which this processing scheme is based, the value cb is assumed to be an estimate of the noise energy in the sound signal received at microphones 301A, 301B. Thus, calculation of the value cb provides an example of the generation of a noise estimate as performed in block 215B of FIG. 2A.

Next in block 320 a corresponding signal-to-noise ratio is calculated by dividing cf by cb, which effectively represents a ratio of the forward facing energy in the received sound signal (cf) and the rearward facing energy in the received sound signal (cb). Next 322, this signal-to-noise ratio is converted to decibels. Thus, blocks 320,322 implement the block 208B illustrated in FIG. 2.

Figure 7:
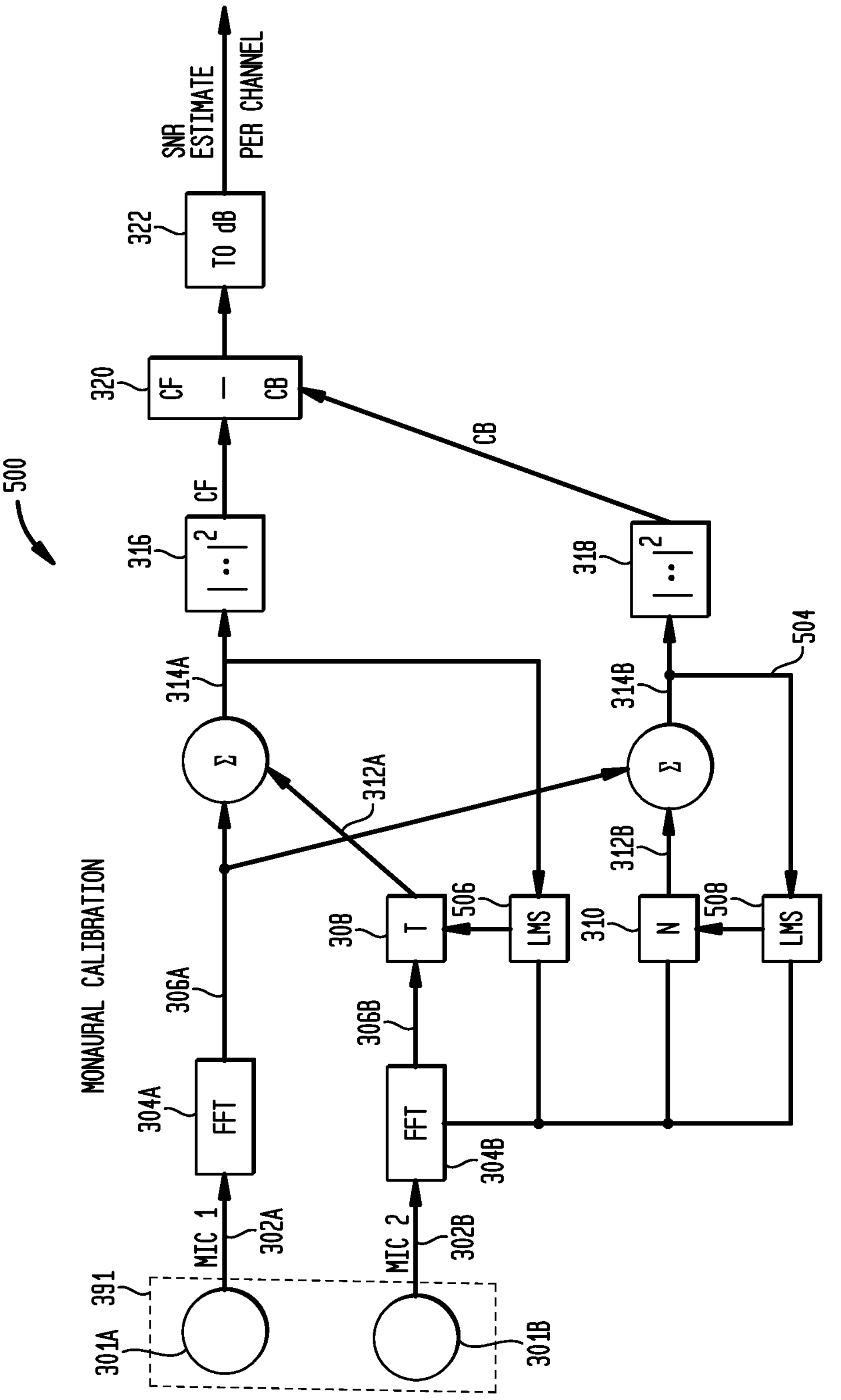
FIG. 7 schematically illustrates an exemplary scheme for calibrating the SNR estimator of FIG. 5.

As would be appreciated, it is desired to calibrate the system for proper filter coefficients T and N. The two filters can be calibrated by placing the device, or more specifically microphone array 391 in an appropriate acoustic environment and using a least means square update procedure to minimize the cardioid output signal energy. FIG. 7 illustrates a calibration setup which may be used.

Sound processing system 500 of FIG. 7 is substantially the same as system 300 described above with reference to FIG. 5 and, as such, like components have been numbered consistently. System 500 differs from system 300 of FIG. 5 in that it additionally includes feedback paths 502 and 504 that each include a least mean squares processing block 506 and 508, respectively. In use, microphone array 391 is presented with a broadband acoustic stimulus that includes sufficient signal-to-noise ratio at each frequency so as to enable the least mean squares algorithm to converge. The front facing cardioid is determined by presenting the acoustic stimulus from the rear direction and the least mean squares algorithm adapts to generate filter coefficients that cancel the acoustic stimulus, thereby providing a polar pattern with minimal sensitivity to the rear, and maximum sensitivity to the front. The opposite process is performed for the rear facing cardioid by placing the acoustic stimulus in the front. As would be appreciated, the level of directionality required can be adjusted by presenting calibration stimuli across appropriate angular ranges. For example, when calibrating the first cardioid, it may be preferable to use an acoustic stimulus which is spread over a range of angles e.g., the entire rear hemisphere rather than from a single point location. In this case the optimal polar pattern may converge to a hyper cardioid or other polar plot and thus provide the desired directional tuning of the system. Other patterns are also possible.

For the directional noise and SNR estimates described above, a measure of confidence may also be generated. In certain embodiments, the confidence measure may be based on the coherence of the two microphone input signals 302A, 302B that are used to create the directional signals. High coherence (i.e., close to 1) indicates high correlation between the two microphone outputs and indicates that there is strong directional information in the received sound signals. This correlation consequently indicates that there is a high confidence in the measured signal-to-noise ratio. On the other hand, a low coherence (i.e., close to 0), indicates uncorrelated microphone signals, such as can occur in conditions of high reverberation, turbulent air flow etc. This low coherence indicates low confidence in the measured signal-to-noise ratio. The coherence between the microphone inputs can be calculated as follows in a two microphone system.

Where Sx and Sy are the complex frequency spectrums of the two microphones' signals 302A and 302B used to create cf:

Sx* and Sy* are the complex conjugates of Sx and Sy respectively.

Pxx=Sx* Sx and Pxy=Sy* Sy are the 2-sided auto-power spectrums for each signal and Pxy=Sx* Sy is the 2 sided cross power spectrum for the signals; and $$Cxy = \frac{|Pxy|^2}{(PxxPxy)}$$

is the coherence.

The auto-power spectrums, Pxx and Pyy, are preferably averaged across multiple FFT frames which introduces smoothing over time into the confidence measure.

As previously noted, a coherence value Cxy that is close to 1 indicates that the assumptions on which the noise and SNR estimate is based, namely that the one discernable spatial characteristic in the sound, is holding. A low coherence value indicates that the spatial characteristics cannot be discerned and as such the noise or SNR estimations are likely to be inaccurate.

Figure 8:
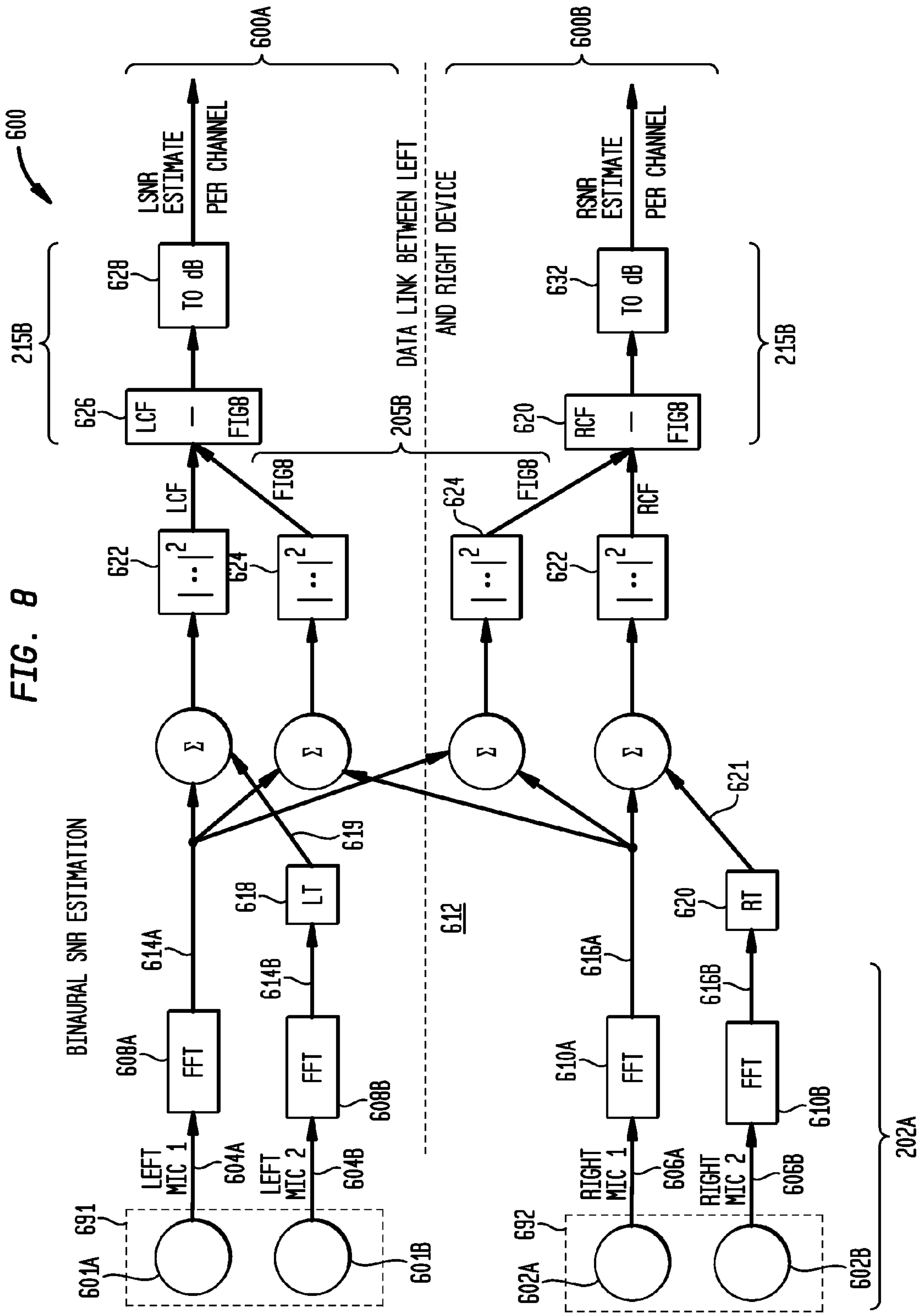
FIG. 8 illustrates a second example of a binaural SNR estimator, in accordance with embodiments of the present invention.

Other embodiments of the present invention may use binaural sound receiving devices and provide binaural outputs. A bilateral cochlear implant is an example of such an arrangement. In such embodiments, a modified signal-to-noise ratio (SNR) estimator is used. FIG. 8 illustrates an exemplary sound processing system 600 which includes a left side sub-system 600A and a right side sub-system 600B. The systems are named as left and right sides because the process signals are acquired from the left and right sides of the device respectively and/or intended to be replicated on the left or right side of the recipient. In system 600 of FIG. 8, a left array of microphones 601 receives a sound signal and a right array of right microphones 602 also receives a sound signal. Time domain analog outputs 604A, 604B from microphones 601A and 601B of the left array 601 are converted to digital signals and processed by an FFT stages 608A and 608B, respectively. Similarly, outputs 606A and 606B from microphones 602A and 602B of the right array 602 are converted to digital signals and processed by FFT stages 610A and 610B, respectively. These stages operate in a manner similar to that described in relation to the previous embodiments.

Figure 9:
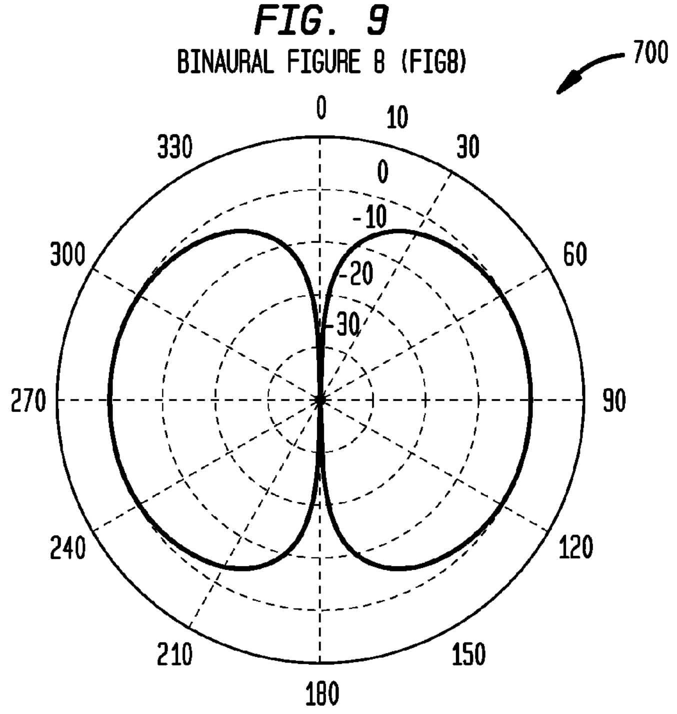
FIG. 9 illustrates a binaural polar plot that is associated with the SNR estimation of FIG. 8.

In this binaural implementation, in addition to the microphone arrays, system 600 also includes a two way communication link 612 between the left and right signal processing sub-systems 600A, 600B. In this example, for each microphone array, 601, 602, a front facing cardioid cf is generated as described above for the monaural implementation. However, instead of using a rear facing cardioid cb, a binaural "FIG. 8" pattern is generated. This is produced by subtracting outputs 614A, 616A generated from the left and right microphone arrays 601, 602. An exemplary polar pattern for the binaural system 600 is illustrated in FIG. 9. As can be seen by the polar plot 700, the polar pattern is sensitive to the left and right directions, but not to the front or back.

In a similar manner to that described in relation to the monaural implementation, the output 614B derived from one of the microphones on the left side is filtered and subtracted from the other left side signal 614A. For example, input 614B is filtered using the LT filter 618 and the output 619 is subtracted from signal 614A derived from the left microphone 601A. The output of this subtraction is then converted to an energy value at 622 in the same manner as described in relation to the last embodiment, to generate Lcf. Similarly, a common "FIG. 8" output is generated to act as a binaural example of an assumptions based noise estimate. This is performed by subtracting the output 616A, derived from the right microphone 602A, from the output 614A of the left microphone 601A. This signal is converted to an energy value in blocks 624 to generate the "FIG. 8" signal. The right side forward cardioid signal Rcf is generated by subtracting the filtered output 621 of signal 616B using filter RT 620 and subtracting this from signal 616A, which was derived from the right microphone 602A. In this way a common noise estimate is generated for the binaural system, and left and right "signal" cardioids have also been generated.

Next, left and right SNR estimates can be generated as follows. The Lcf signal is divided by the "FIG. 8" signal in block 626 to generate a left side signal-to-noise ratio (LSNR) estimate. This is converted to decibels by taking base 10 logarithm and multiplying by 10 in block 628. A right side signal-to-noise ratio (RSNR) estimate is then generated by dividing the Rcf signal by the "FIG. 8" signal in block 630 and converting this output to decibels as described above.

This binaural signal-to-noise ratio estimation can be particularly effective because the binaural nature of the output signals is maintained. As with the monaural embodiment, a confidence measure for each noise estimate or SNR estimate can be generated using a correlation method similar to that described in relation to the monaural implementation.

As discussed in connection with FIGS. 2A and 2B, output stages 209 and 219 either select or combine, one or more of the noise component estimates and signal-to-noise ratio (SNR) estimates for a given signal component, for use in further processing of the audio signal. The decision whether to combine or select the best estimates, and the manner of selection or combination, may be in a variety of ways. For example, in situations where noise and speech originate from the same direction, the proposed assumptions-based noise estimation methods may not work optimally. Therefore, in certain situations it may be preferable to use a statistical model based estimate, or some other form of noise or SNR estimate, generated by the system, or to combine these estimates. Moreover, single channel noise-based estimation techniques tend to perform poorly at low SNR, or in conditions where the a-priori assumptions about speech and noise characteristics are not met, such as when noise contains speech like sounds. However, a single channel-noise based estimate of SNR may be combined with the directional SNR estimate, and using the respective confidence measure for each, provide a combined estimate of SNR that is based on directional information and spectro-temporal identification of speech and noise-like characteristics. When the confidence of an SNR estimation technique is high, that measure has greater influence over the combined SNR estimate. Conversely, when the confidence in a technique is low, the measure exerts less influence over the combined SNR estimate. Similar principles apply to combining or selecting noise estimates.

Figure 10:
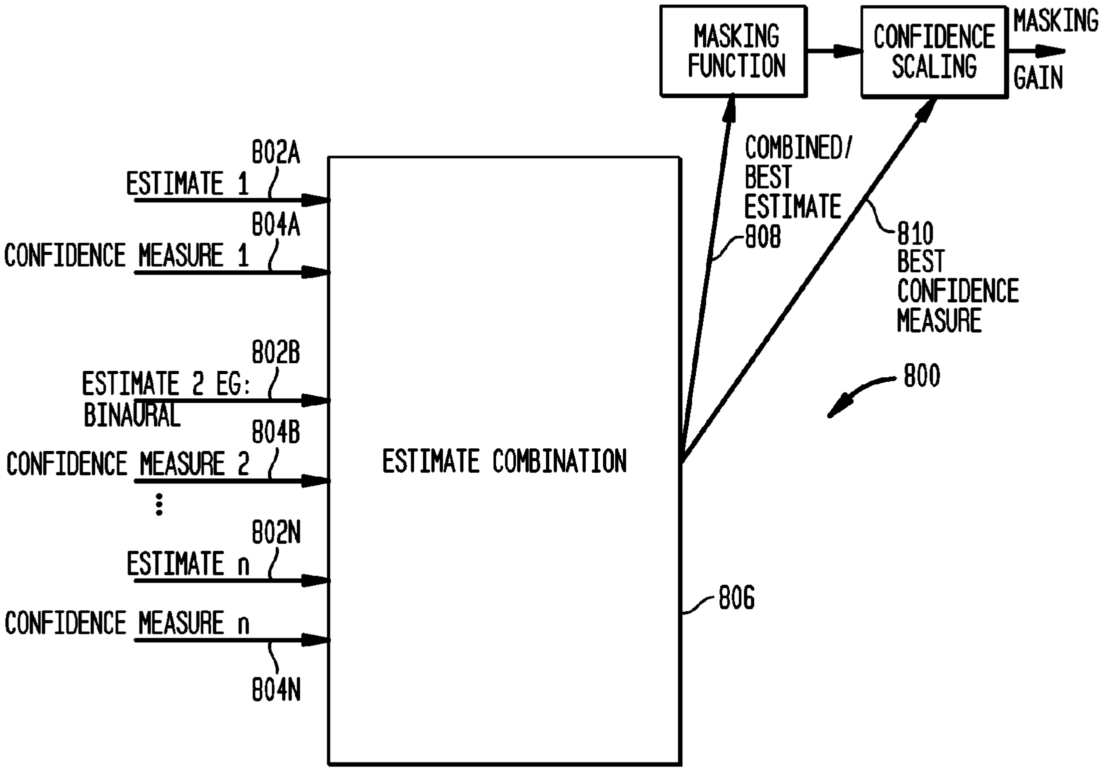
FIG. 10 schematically illustrates a sub-system for combining a plurality of SNR estimates, in accordance with embodiments of the present invention.

FIG. 10 is a schematic illustration of a scheme for combining either noise or SNR estimates performed in output stages 209, 219 of FIG. 2A. In this example, n estimates 802A, 802B to 802N are received at a estimate combiner (output stage) 806, along with a corresponding confidence measure 804A, 804B to 804N. Estimate combiner 806 then performs a selection or combination according to predetermined criteria.

In one embodiment, individual noise or SNR estimates and their associated confidence measures can be combined in a variety of different ways, including, but not limited to: (1) selecting the noise or SNR estimate with the best associated confidence measure; (2) scaling each noise or SNR estimate by its normalized confidence measure (normalized such that the sum of all normalized confidence measures is one) and summing the scaled noise or SNR estimates to obtain a combined estimate; or (3) using the noise or SNR estimates from the estimation technique which produced the greatest (or smallest) noise or SNR estimate at a particular frequency. This selection process can be performed on a channel by channel basis, for groups of channels, or globally across all channels.

The resulting noise or SNR estimate 808 for each signal component, along with corresponding confidence measures 810, are output. The outputs 808 and 810 are then used in further processing stages of the sound processing device (e.g. by subsequent noise reducer 210 or by channel selector 212 in a cochlear implant).

Figure 11:
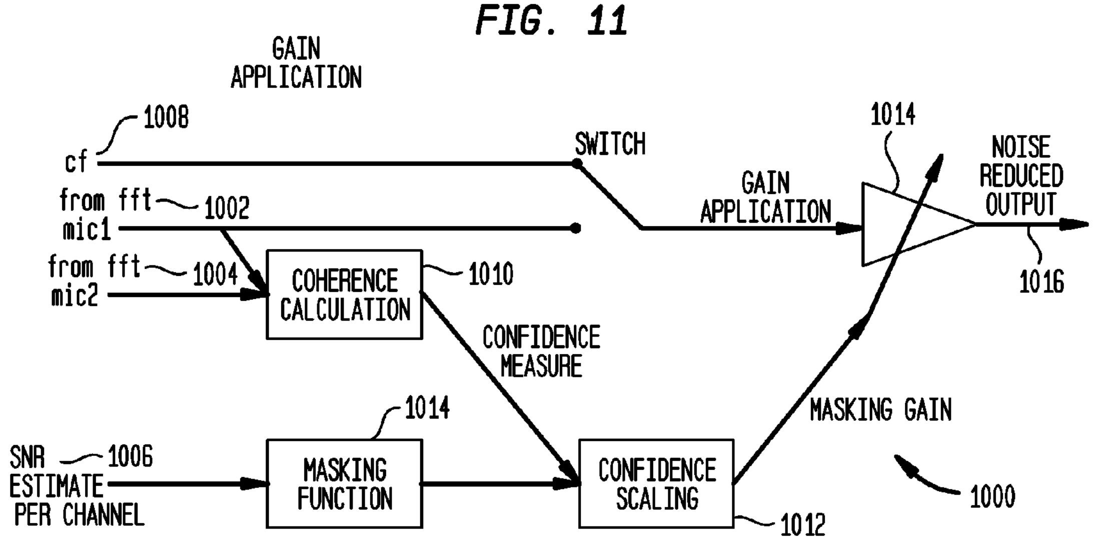
FIG. 11 schematically illustrates a gain application stage, in accordance with embodiments of the present invention.

FIG. 11 illustrates an exemplary gain application stage 1000 that implements an embodiment of the noise reducer 210 of FIG. 2B, as well as sub-blocks 225, 227, 229 and 231. The present example is a monaural system that is configured to work in conjunction with system 300 illustrated in FIG. 5. Accordingly, the inputs to the gain application stage 1000 are: signal inputs 1002, 1004 which are frequency domain representations of the outputs from the microphones in a microphone array (such array 301 of FIG. 3); a signal-to-noise ratio estimate 1006 for each frequency channel, and a front cardioid signal 1008 (such as cf of FIG. 5) which has been derived from signals 1002 and 1004.

In system 1000 of FIG. 11, a coherence-based confidence measure is used to scale the gain applied to each frequency bin. A coherence calculator 1010 receives inputs 1002 and 1004, and calculates a coherence value between the sound signals arriving at each of the microphones in the manner described above in connection with FIG. 5. This coherence-based confidence measure is then used by gain modifier 1012 to scale the masking function 1014 used to affect the level of gain applied to the chosen input signal. In this example, the use of a confidence scaling 1012 means that a gain is only applied (or applied fully) when the confidence is high. However, if the confidence is low, no gain is applied. This effectively means that when the system is uncertain of its SNR estimation performance, the system will tend to leave the signal unaltered.

The SNR estimate 1006 is used to calculate a gain between 0 and 1 for each frequency bin using a masking function in block 1014. In the simplest case, the gain function used is a binary mask. This mask applies a gain of 0 to each frequency bin having a SNR that is less than a threshold, while a gain of 1 is applied to each frequency bin where the SNR is greater than or equal to the threshold. This has the effect of applying no change to frequency bins with good SNR, while excluding from further processing frequency bins with poor SNR.

Figure 12:
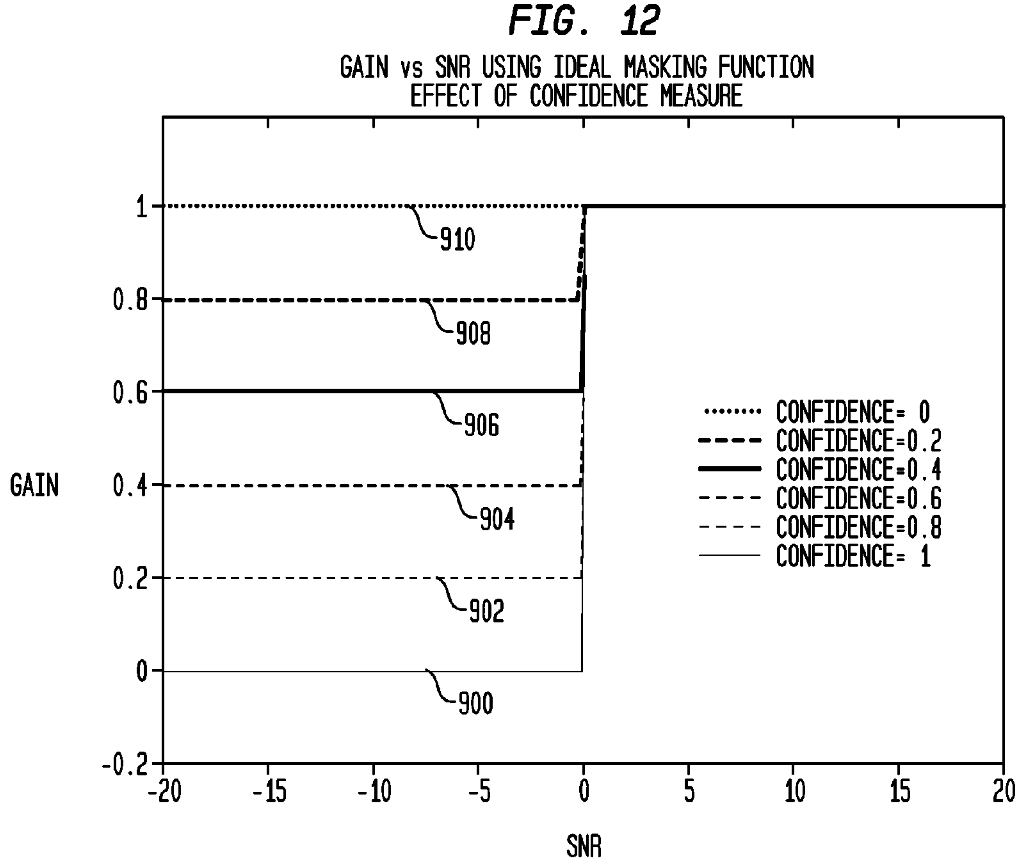
FIG. 12 illustrates a masking function used in embodiments of the present invention.

FIG. 12 illustrates the effect on the level of gain applied to the input signal at different confidence measures. In FIG. 12, six gain masks 900, 902, 904, 906, 908, 910 are illustrated. Each gain mask corresponds to a given confidence measure as indicated. Generally, each gain mask 902 to 910 represents the same underlying gain function 900, being a binary mask with a threshold at 0 dB SNR, but which has been proportionally scaled by the confidence measure associated with the estimated SNR level. The gain masks are flat either side of a threshold, which in this case is an SNR of 0. Other SNR values can be used as a threshold as will be described below. In use, the masking function block 1014 provides the appropriate gain value for the signal, depending on the SNR estimate for the channel and the gain function. The gain is then scaled by the confidence scaling section 1012 depending on the output of the coherence calculation section 1010. As will be appreciated, the present example shows a linear scaling of gain by confidence level. However, more complex, possibly non-linear scaling can be used.

It will be appreciated that coherence can be calculated on a per channel basis, and the confidence scaling is also applied on a per channel basis. This allows one channel to have good confidence while another does not. In addition, the confidence measure can be time-averaged to control the responsiveness of the system.

The inventors have determined that improved system performance, in terms of speech perception of users, can be obtained in cochlear implants, by carefully selecting the gain curve parameters. As such, alternative masking functions are within the scope of the present invention. Previous mathematically defined gain functions have treated errors of including noise and errors of reducing speech as equal. More recent work with psychometrically motivated gain functions has demonstrated that a preference for a negative gain function threshold was chosen by normal listeners.

This observation was further supported by ideal binary mask studies, which suggest that best speech performance can be achieved with gain threshold between 0 and −12 dB.

One prior art approach is to use ideal binary mask (1 dBM) which removes masker dominated and retains target dominated components from a noisy signal. Studies which have investigated the gain application threshold (GT) proposed the use of threshold values between −12 dB and 0 dB, or −20 dB and 5 dB in the special case when the SNR is known. Outside of this threshold range, speech perception is conventionally believed to degrade quickly. Generally, since 0 dB is at the edge of the range, a lower threshold of −6 dB has been proposed so as to allow the greatest room for error in SNR estimation in real-world systems. A subsequent 1 dBM study has used a GT of −6 dB with normal listeners and hearing impaired, showing that this significantly improves speech perception. The underlying premise of these noise reduction thresholds is that they remove half or less of the noise on average to produce maximal speech improvement. This has lead to the acceptance by those skilled in the art of a gain function for cochlear implant applications that has a threshold SNR value of less than 0 dB.

However it has been recognized by the inventors that this approach of using a binary mask with a negative GT for cochlear implant noise reduction assumes that the GT for normal listening and cochlear implant recipients is the same. Moreover, in practice the true SNR is not known, and therefore the 1 dBM cannot be calculated.

Experiments performed by the inventors, using an SNR estimate (as opposed to a known SNR) show improvements in speech perception of a noise reduction system using a binary mask with a GT much higher than previously expected. In this respect, the present inventors propose a positive SNR threshold. More specifically test results showed improvements in speech perception using a binary mask with a GT of above 0 dB and up to 15 dB.

The experimental results of the inventor's show a preference of cochlear implant recipients for a GT of above approximately 0 dB, and more preferably above approximately 1 dB and less than about approximately 5 dB for stationary white noise, and around 5 dB and for 20-talker babble.

FIG. 12 illustrates a binary mask 900 which applies a gain of either 0 or 1 based on which side of an SNR threshold a channel's SNR estimate lies. However, it is possible, and may be preferred, to use other masking functions, in which the gain applied to the channel changes more gradually about the threshold point.

Previous mathematically defined gain functions have treated errors of including noise and errors of reducing speech as equal. Accordingly, some prior art proposes that a Wiener Function (threshold=0 dB) is optimal. Such gain functions used in known cochlear implant noise reduction algorithms retain signals with positive SNR and apply different levels of attenuation to signals with negative SNRs. More recent prior art with psychometrically motivated gain functions has demonstrated that a preference for a negative gain function threshold was chosen by normal listeners.

A second study performed by the inventors also supported the inventor's view. Specifically, it was determined that the most suitable gain function for noise reduction, with respect to speech perception and quality factors for cochlear implant recipients, differ from the mathematically optimized gain functions, normal listening psychometrically motivated gain functions and proposed cochlear implant gain functions of the prior art.

In this study, a parametric Weiner gain function was used to describe the gain curve instead of the binary mask. The parametric Weiner gain function is described by $$Gw(\xi) = \left(\frac{\xi(t, f)}{\xi(t, f) + \alpha}\right)^{\beta}$$

where Gw is the gain applied , $\xi$ is the a priori SNR estimate and $\alpha$ and $\beta$ are the parametric Weiner variables.

$$\alpha=10^{(threshold\ value/10)}$$

$$\beta=10^{(slope\ value/10)}$$

A range of threshold and slope values were selected by the recipient's as their most preferred gain threshold, showing a wide range of gain curve shapes. In continuous stationary white noise conditions, a gain threshold above approximately 0 and up to approximately 5 dB produced the best speech perception. Results in 20-talker babble showed that a gain threshold of approximately 5 dB produced the best speech perception. In the case where only one gain function threshold is selected for all noise conditions, these results suggest that a gain threshold of approximately 5 dB would be most suitable.

As will be appreciated, both the threshold value and slope value, play a part in the overall attenuation outcome. However, if a noise reduction method uses an estimate of the signal noise, such as Spectral Subtraction techniques or SNR-Based noise reduction techniques, the inventors have determined that improved performance can be obtained for cochlear implant users using a gain function that has any section which lies between a parametric Wiener gain function parameter values of $\alpha$=0.12 and $\beta$=20, and a parametric Wiener gain function parameter values of $\alpha$=1 and $\beta$=20, over the range of instantaneous SNRs between the −5 and 20 dB instantaneous SNR range.

Because of the variations in preferred slope and threshold values between recipients, it is also useful to compare gain curves by considering an absolute threshold of the gain curve (as distinct to the Weiner gain function threshold "threshold value" set out above). The absolute threshold can be defined as the level at which the output of the system would be half the power of the input signal, which is the approximate −3 dB knee point.

In this regard, in the inventor's testing, it was found that the preferred absolute threshold of the gain curve for cochlear implant recipients should be at an instantaneous SNR of greater than approximately 3 dB, but less than approximately 10 dB. Most preferably it should be between approximately 5 dB and approximately 8 dB. Although the knee point could lie outside this range, say between approximately 5 dB and approximately 15 dB.

Figure 15:
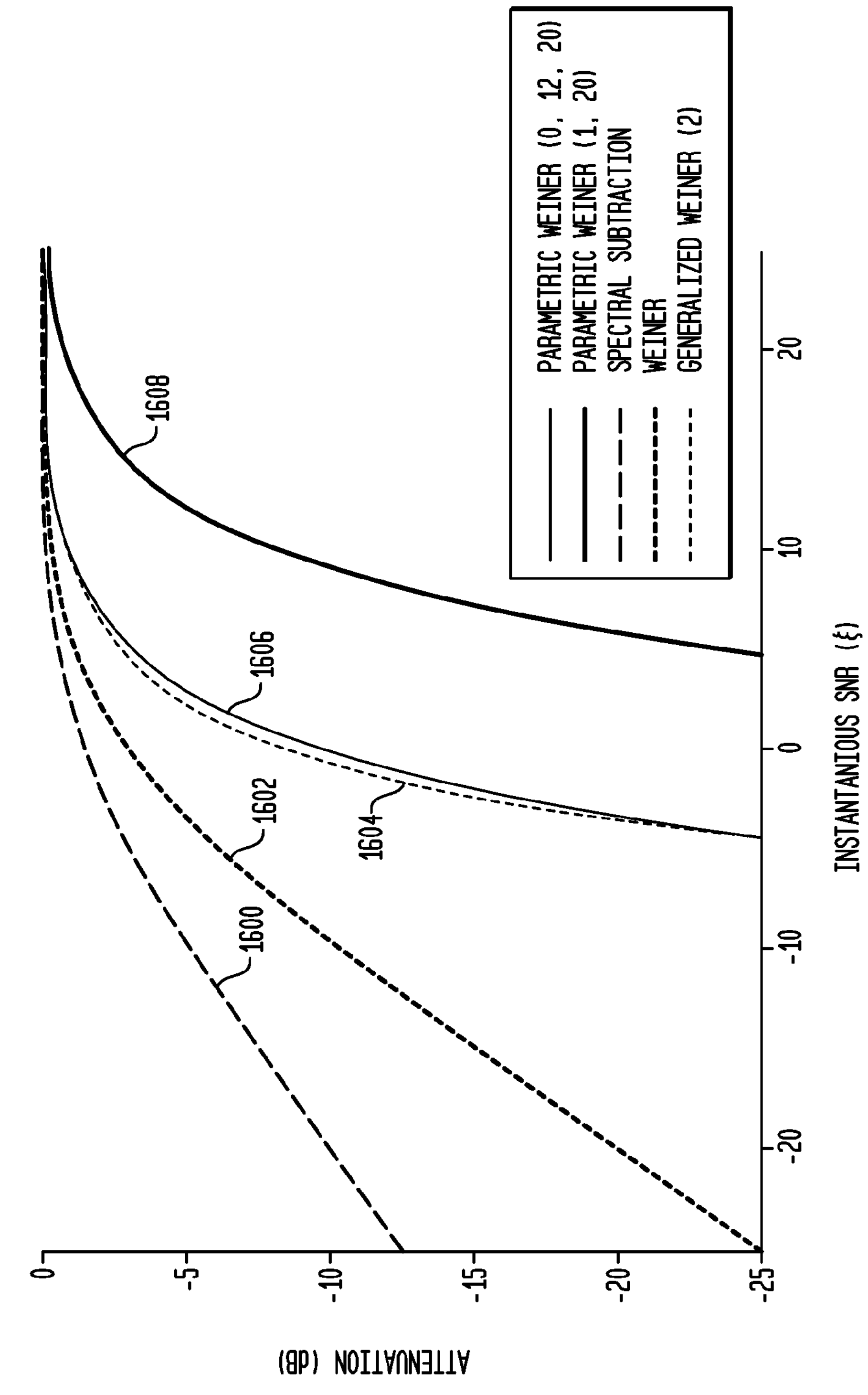
FIG. 15 illustrates gain curves that may be used in embodiments of the present invention.

FIG. 15 shows a series of gain curves to illustrate the difference between known gain curves and a selection of exemplary gain curves proposed in accordance with embodiments of the present invention. FIG. 15 shows the following gain curves:

1. The spectral subtraction gain function 1600 of Yang L P and Fu Q J. Spectral subtraction-based speech enhancement for cochlear implant patients in background noise. J Acoust Soc Am 117: 1001-1004, 2005)
2. The parametric Wiener gain function 1602 of Dawson P W, Mauger S J, and Hersbach A A. Clinical Evaluation of Signal-to-Noise Ratio Based Noise Reduction in Nucleus Cochlear-Implant Recipients. Ear Hear, In Press), and
3. The generalized Wiener function 1604 with a variable of Hu Y, Loizou P C, Li N, and Kasturi K. Use of a sigmoidal-shaped function for noise attenuation in cochlear implants. J Acoust Soc Am 122: EL128-134, 2007).

Gain curves 1606 and 1608 define the preferred gain curve region proposed in accordance with embodiments of the present invention. Specifically, curve 1606 defines the "low side" of the preferred region of the operation, while curve 1606 defines the "upper side" of the region.

Additionally, rather than the confidence measure directly scaling the gain curve as previously described, the gain of the signal can be scaled using confidence measure in the dB domain.

Further improvements in noise reduction may be provided by implementing a process for choosing an input signal on which noise reduction will be performed, as illustrated in block 225 of FIG. 2B. Typically the masking gain 1014 is applied to a frequency domain signal generated from either one of the microphone signals, 1002 or 1004. However, the gain may alternatively be applied to another signal derived from these 'raw' signals, such as signal cf 1008. In this case, signal cf, 1002 may be viewed as a noise reduced signal, if the received sound has suitable directional properties, since it does not contain sound originating from behind the recipient. The choice between using the microphone signal 1002 or the cardioid signal cf 1008 may be based on the confidence measure associated with the directional-based noise and SNR estimate, which is determined by coherence calculator 1010. A high coherence indicates that the directional assumptions about the received sound are holding (i.e., the sound is highly directional and confidence in the noise component estimate is high). In this case, the signal cf 1008 is selected. However, if the coherence is low, the signal 1002 is used. Again the coherence can be a channel specific measure and that signal selection need not be the same across all frequency channels.

The chosen input signal then has the determined gain applied, by the gain application stage 1014 to generate a noise reduced output 1016. The noise reduced output 1016 is then used for further processing in the sound processing system.

Figure 13:
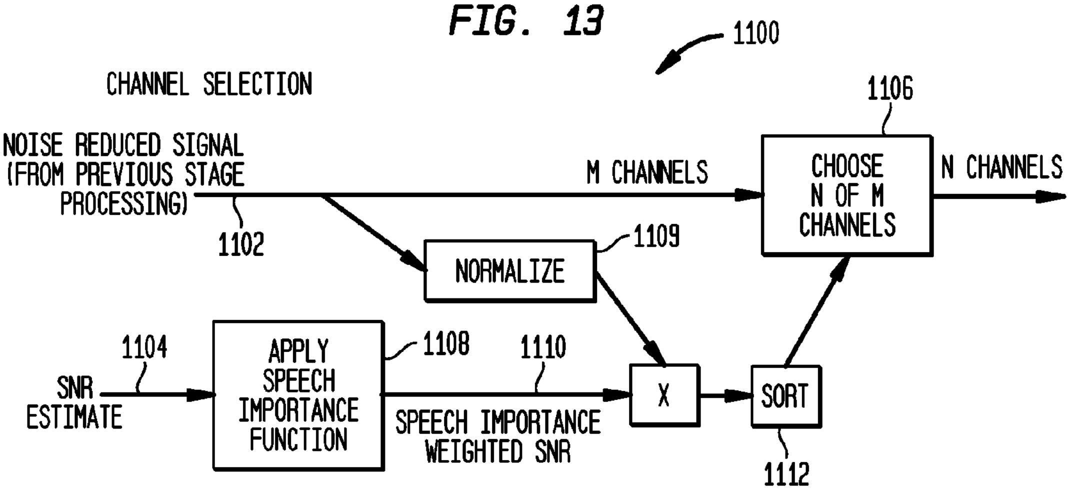
FIG. 13 illustrates a channel selection strategy for a cochlear implant, in accordance with embodiments of the present invention.

As discussed above, in connection with channel selector 212 of FIG. 2B, in the case where the sound processing system is utilized in cochlear implant or other similar device it is, it is typically necessary to select a subset of spectral components (channels) which are subject to further processing and ultimately applied to the electrodes of the implant. FIG. 13 illustrates a channel selector 1100 usable for such a purpose. The channel selection subsystem, or simply channel selector 1100, receives an input signal 1102 that is preferably a noise reduced signal generated in the manner described above (or in some other way). Channel selector 1100 also has an input signal SNR estimate 1104. SNR estimate 1104 is preferably generated in accordance with the system shown in FIG. 10, and has a corresponding confidence measure associated with it.

Known channel selection algorithms used in cochlear implants typically only choose channels based on the signal energy in each frequency channel. However, the inventors have determined that this approach may be improved by using additional channel selection criteria. Accordingly, other embodiments of the present invention utilize a measure of a channel's psychoacoustic importance, possibly in combination with other channel parameters to select those channels are to be applied to the electrodes of the cochlear implant. For example, in specific embodiments, a very high frequency channel may be present in a signal and have a low SNR level. However, a high frequency signal will not contribute greatly to the speech understanding of a recipient. Therefore, if a suitable channel exists, it may be preferable to select a lower frequency channel having a lower SNR in place of the high frequency channel in order to achieve a more optimal outcome in terms of speech perception for the user.

Figure 14:
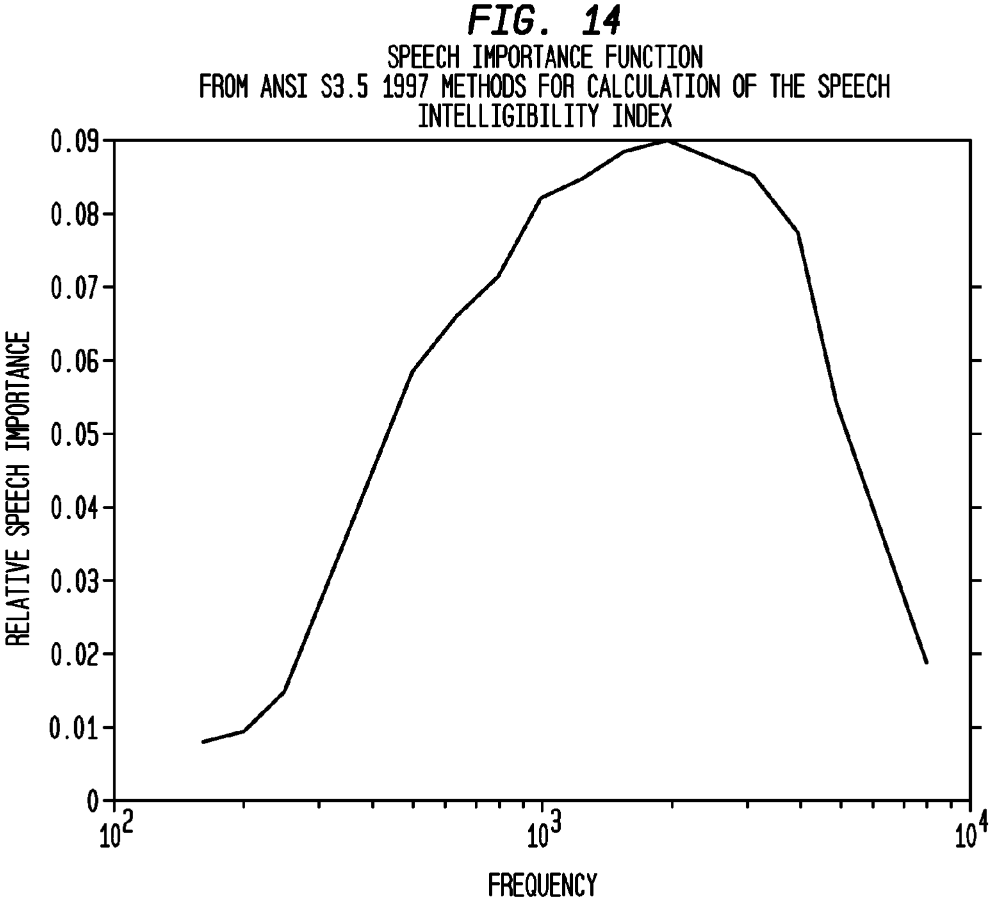
FIG. 14 illustrates a speech importance function that may me used in the channel selection strategy of FIG. 13.

In one illustrative example, 2 kHz is more important for speech understanding than a channel at 6 kHz. To address this issue, a Speech Importance Function, such as that described in the ANSI standard s3.5-1997 'Methods for Calculation of the Speech Intelligibility Index' may be used. This speech importance function is illustrated in FIG. 14 and describes a relative importance of each frequency band for clear speech perception. In the illustrated example, the speech importance function is applied in block 1108 and is used to weight the corresponding signal-to-noise ratio in each frequency band.

It is also possible that while weighting the signal to noise estimates with the speech importance function the channels with large amplitudes may be still excluded if the speech importance weighted SNR is worse than other channels. Amplitude based criterion can also be incorporated into the channel selection algorithm. In order to do this, the relative level of each frequency channel can be calculated in block 1109 by dividing signal energy in each band by the total energy in the signal. The speech importance weighted SNR 1110 is then multiplied by the normalized signal value at each frequency and the channels are sorted in block 1112 to select channels for application to the electrodes of the cochlear implant. As noted above, the channel selection may be part of an n of m selection strategy, as shown in block 1106 of the system 1100, or another strategy not limited to always selecting n of m channels. It should also be appreciated that an approach which simply scales amplitude by signal-to-noise ratio may also be used in channel selection.

The channel selection strategy can be a so-called n of m strategy, in which each stimulation time period up to a maximum of n channels are selected from a total of m available channels. In this case, even if there are more than n channels which have potentially useful signals, only n will be selected. Alternatively, a channel selection strategy may be employed where all channels that meet certain criteria will be selected.

In addition to selecting channels based on factors such as SNR, amplitude and speech importance, the spectral spread of information may also be used in channel selection. In this regard, where adjacent channels both meet the criteria for selection, it may be that the application of both of these channels would provide no additional information to a recipient due to masking effects. In such cases, one or the other of the channels may be dropped from the stimulation scheme, and one or more other channels picked up as substitutes. The selection of the other substitute channel(s) may be based on the criteria described above, but additionally include spectral considerations to avoid masking by adjacent channels. Such an approach may be similar to the MP3000 stimulation strategy used by Cochlear Limited. This method determines where a channel will be effectively masked by a neighboring channel. In this case, the least important of the two channels will be masked and no upstream stimulation performed. Extending this idea, it is also possible that, where a large number of channels containing beneficial information are present, to temporally spread the stimulation by splitting the stimulation of some electrodes into one temporal group and the stimulation of other electrodes into a second temporal group. For example, if all 22 channels have positive signal-to-noise ratio, but only 8 channels are able to be stimulated every frame, then rather than discarding 14 potentially useful signals, the channels can be split into a number of groups and each group stimulated in successive frames. For example, the 8 largest "odd channels" may be placed in one group, and the 8 largest "even channels" may be placed in another group and each group can then be stimulated in successive frames.

FIGS. 2A and 2B illustrated six main functional blocks comprising a system. As noted above, each block may be used together in the manner illustrated in FIGS. 2A and 2B or alternatively the blocks could be used alone, in different combinations, or as components of a compatible, but otherwise substantially conventional, sound processing system. The following examples set out exemplary use cases where only selected subsets of the functions performed by the system of FIGS. 2A and 2B are implemented.

EXAMPLE 1

SNR-based N of M Channel Selection in a Cochlear Implant

Figure 16:
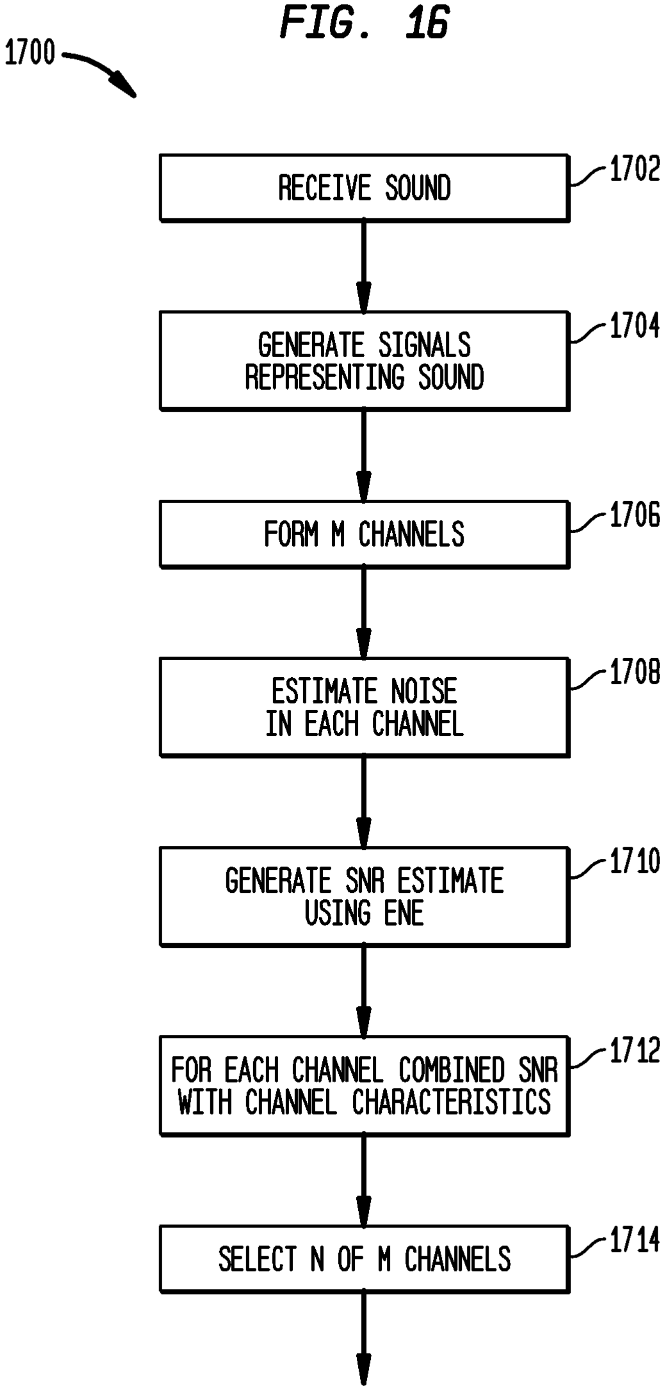
FIG. 16 is a flowchart illustrating a channel selection process in a cochlear implant, in accordance with embodiments of the present invention.

FIG. 16 illustrates a process 1700 for performing an n of m channel selection in a Cochlear implant, based on a signal-to-noise ratio estimate. This exemplary method may be performed by a system that includes implementations of processing blocks 202A, 205A, 215A, 235A, 235B, 235C, 235D, and 239 of FIGS. 2A and 2B.

Process 1700 begins at step 1702, by receiving a sound signal at a microphone. The output from each microphone is then used in step 1704 to generate a signal representing the received sound. This is performed in a manner similar to that described in FIG. 3. In this regard, the output of the microphone is passed to an analog-to-digital converter where it is digitally sampled. The samples are buffered with some overlap and windowed prior to the generation of a frequency domain signal. The output of this process is a plurality of frequency domain signals representing the received sound signal in a corresponding plurality of frequency bins.

In the next step 1706, the frequency bins are combined into a predetermined number of signals or channels for further processing. In certain embodiments, there are 22 channels that correspond to the 22 electrodes in a cochlear implant.

In step 1708, a noise estimate for each channel is created using a minimum statistics-based approach in a manner described in connection with the above in connection with FIG. 4. Next, in step 1710, the noise estimate from step 1708 is used to generate a signal-to-noise ratio (SNR) estimate for each channel. The SNR estimate is generated using the following formula:

$$SNR = \begin{cases} \frac{SIG}{ENE} - 1, & \text{if } \frac{SIG}{ENE} \geq 1 \\ 0, & \text{Otherwise,} \end{cases}$$

where all of the terms in the formula have the meanings defined above.

In the next step 1712, for each channel, the SNR estimate is multiplied by the relative speech importance of the central frequency of the channel, and then the normalized amplitude of the signal in the channel, to generate an overall channel importance value. The relative speech importance of the central frequency of the channel may be derived using the speech importance function described in FIG. 14.

In the next step 1714, up to n channels having the highest channel importance value are selected from the m channels. In certain embodiments, n=8 and m=22. The chosen channels are further processed in the cochlear implant to generate stimuli for application to the recipient via the electrodes.

As will be appreciated, the present exemplary process can obtain benefits of at least one aspect of the present invention, but would not require the complexity of the system able to implement all sub-blocks of the functional block diagram of FIGS. 2A and 2B.

EXAMPLE 2

Combination of SNR Estimates for Noise Reduction in a Hearing Aid

Figure 17:
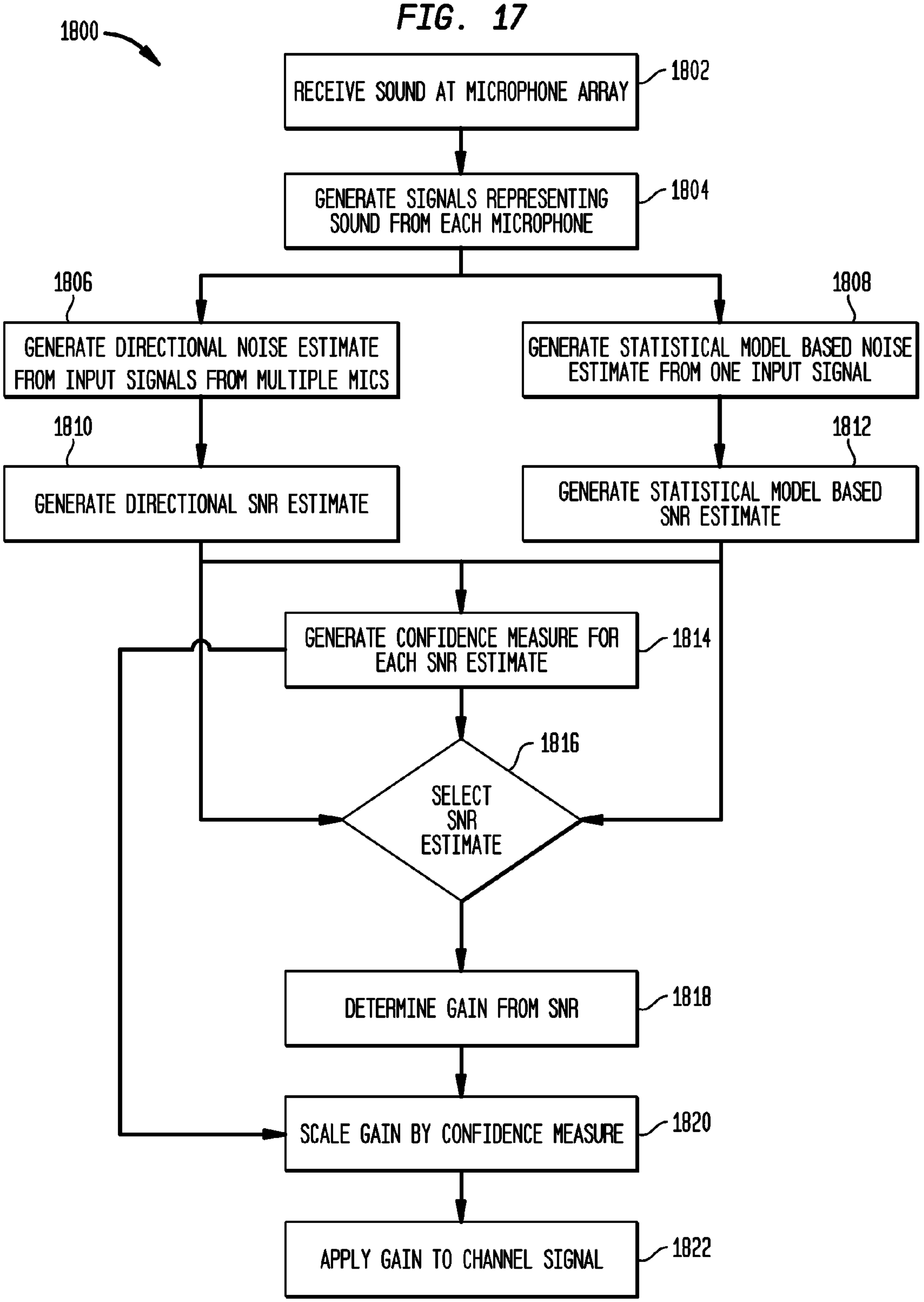
FIG. 17 is a flowchart illustrating a noise reduction process, in accordance with embodiments of the present invention.

FIG. 17 illustrates a process 1800 for using combined SNR estimates for noise reduction in a hearing prosthesis. A system performing this method will only require implementations of the following functional blocks illustrated in FIGS. 2A and 2B: 202B, 205A, 205B, 215A, 215B, 219, 227, 229, and 231.

Process 1800 begins at step 1802 by receiving a sound at a beam forming array of omnidirectional microphones, of the type illustrated in FIG. 3. In the next step 1804, the analog time domain signal from each of the microphones is digitized and converted to a respective plurality of frequency band signals representing the sound in the manner described above. Next, at step 1806, a directionally based noise estimate, cb, is generated at each frequency, in the manner described in connection with FIG. 5. Additionally, in step 1808, a statistical model-based noise estimate is generated in a manner described in connection with FIG. 4.

In step 1810, the directional noise estimate is converted to a SNR ratio estimate, also as described in connection with FIG. 5. At step 1812, the statistical model-based noise estimate is used to generate a statistical model-based SNR estimate in the same manner as the previous example.

In step 1814, at each frequency, a confidence measure is generated for each of the SNR estimates determined in steps 1810 and 1812. At each frequency, the SNR estimate having the highest associated confidence value is selected in step 1816 as the final SNR estimate for the channel. Next, in step 1818, the selected SNR value is used to determine the gain to be applied to a channel using a binary mask having a threshold at 0 db.

In step 1820, the effect of the gain value determined in step 1818 is varied to account for the confidence level of the SNR estimate on which it is based. This is performed by scaling the gain level associated SNR estimate by its associated confidence measure to determine a modified gain value to apply to the signal. The gain is applied to the signal in step 1822 to generate a noise reduced output signal for further processing by the hearing aid.

Again, it can be seen from this example that advantages of certain aspects of the present invention can be obtained without implementing each of the functional blocks of FIGS. 2A and 2B. This allows certain embodiments to have much reduced functional complexity than the overall system described in FIGS. 2A and 2B.

In alternative embodiments of the present invention, noise estimator 250 shown in FIG. 4 may be modified to eliminate the environmental noise estimator 248. In such embodiments, either the directional reference noise signal cb or the binaural "FIG. 8" signal can be used as the environmental noise estimate. In this way, the noise estimate is derived from a signal that is presumed to contain only noise. In situations where the directional assumptions underpinning the use of these directional signals is accurate, this approach may lead to a more robust estimate of the true noise. In particular, where noise has speech like characteristics but emanate from unwanted directions, such an approach may be particularly advantageous.

It should be appreciated that the noise and SNR estimation techniques described herein are performed on spectrally limited channels. As noted earlier, similar noise and SNR estimation techniques may be used on a range of different spectrally limited signals. For example, noise and SNR estimation by be performed on an FFT bin basis, on a channel-by-channel basis on some predetermined or arbitrarily selected frequency band in the input signal, or on the entire signal.

In embodiments in which noise or SNR estimation and noise estimation is performed on a single FFT bin basis, a noise or SNR estimate for a corresponding channel could be calculated from some or all of the FFT bins that contribute to that channel. For example, each of the noise or SNR estimations for the contributing FFT bins to each channel could be combined either by: averaging, by selecting a maximum, or through any other form of combination to derive the noise or SNR estimation for the channel.

It is also possible that the noise or SNR estimation may be performed on signals having a spectral bandwidth that differs from that of the signal itself. For example, double the number of FFT bins may be used to estimate the noise level SNR for a channel, e.g. by using surrounding FFT bins as well as contributing FFT bins.

Similarly, a noise or SNR estimation for the channel may be derived from only one contributing component. A variation on this scheme allows noise or SNR estimation from one spectral band to be used to influence a estimate of another spectral band. For example, neighboring bands' estimates can be used to moderate or otherwise alter the noise or SNR estimate of a target frequency band. For example, extreme, or otherwise anomalous SNR estimates may be adjusted or replaced by noise or SNR estimates derived from other, typically adjacent, frequency bands.

As can be seen from the foregoing, a system as described herein, using multiple signal-to-noise ratio estimates, has the freedom to select which signal-to-noise ratio estimates to use, for a given frequency bin, channel or frequency band, and/or how multiple SNR estimates can be combined. Moreover, the system can be set up to additionally enable a selection of the type of SNR estimates are available in different listening environments. For example, rather than always using a directional signal-to-noise ratio estimate and a minimum statistics derived signal-to-noise ratio estimate other noise estimation techniques could be used, including but not limited to: maximum noise estimation; minimum noise estimation; average noise estimation; environment specific noise estimation; noise level specific noise estimation; patient input noise estimation; and confidence measure based noise estimation.

For example, in a user selected mode for "driving" a noise specific noise estimate (tuned to estimate road noise) and a minimum statistics noise estimation can be used. In this case a directional measure of noise cancelling may be inappropriate as it may mask important sounds such as sirens of emergency vehicles approaching from behind. On the other hand, a "conversation" specific noise estimation is likely to benefit from the inclusion of a directional SNR estimate.

It will be understood that the invention disclosed and defined in this specification extends to all alternative combinations of two or more of the individual features mentioned or evident from the text or drawings. All of these different combinations constitute various alternative aspects of the invention.

The invention described and claimed herein is not to be limited in scope by the specific preferred embodiments herein disclosed, since these embodiments are intended as illustrations, and not limitations, of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims. All documents, patents, journal articles and other materials cited in the present application are hereby incorporated by reference.

What is claimed is:

1. A sound signal processing method, comprising:

generating an electrical representation of a received sound signal;

determining a plurality of noise-component estimates for the received sound signal;

determining one or more confidence measures, wherein each of the one or more confidence measures is associated with at least one of the plurality of noise-component estimates and provides an indication of a reliability of the corresponding at least one noise-component estimate;

calculating a weighted sum of the plurality of noise-component estimates on the basis of the one or more confidence measures;

based on the weighted sum of the plurality of noise-component estimates, processing the electrical representation to provide a control signal; and using the control signal to cause a stimulator component of a stimulating prosthesis to provide a stimulus to a recipient of the stimulating prosthesis.

2. The method of claim 1, wherein, for each of the plurality of noise-component estimates, generating the noise-component estimate comprises generating at least one signal-to-noise ratio estimate of the received sound signal.

3. The method of claim 1, wherein a high-value confidence measure is indicative of a more reliable noise-component estimate than is a low-value confidence measure.

4. The method of claim 1, wherein processing the electrical representation to provide the control signal comprises, scaling an effect applied to a frequency component of the electrical representation.

5. The method of claim 1, wherein processing the electrical representation to provide the control signal comprises, scaling a gain applied to the electrical representation.

6. The method of claim 1, wherein each of the one or more confidence measures is further based on a standard deviation of a plurality of differences, during a non-zero time period, between the energy of the input signal and one of the one or more noise-component estimates.

7. The method of claim 1, wherein each of the one or more confidence measures has a value between zero and one.

8. The method of claim 1, wherein the stimulating prosthesis comprises a hearing prosthesis.

9. A sound signal processing method comprising:

receiving a plurality of input signals, wherein each of the plurality of input signal represents one of a plurality of spectral components of a sound signal;

for each of the plurality of input signals, determining (i) an energy of the input signal over a non-zero time period, (ii) a psychoacoustic importance of a spectral component represented by the input signal, (iii) one or more noise estimates, and (iv) at least one confidence measure, wherein each confidence measure provides an indication of a reliability of at least one of the one or more noise estimates, and wherein a high-value confidence measure is indicative of a more reliable noise estimate than is a low-value confidence measure;

at least one of selecting or scaling a subset of the plurality of input signals based on at least (i) the energy of each of the plurality spectral components, (ii) the psychoacoustic importance of each of the plurality of input signals, and (iii) the at least one confidence measure for each of the plurality of input signals;

based on the subset of the plurality input signals, generating one or more stimuli; and causing, with a hearing prosthesis, delivery of the one or more stimuli to a recipient.

10. The sound signal processing method of claim 9, wherein at least one of selecting or scaling a subset of the plurality of input signals comprises selecting the one or more input signals based on at least one additional channel characteristic for each of the plurality of input signals.

11. The sound signal processing method of claim 9, wherein the at least one of selecting or scaling the one or more input signals comprises selecting from the plurality of input signals up to a predetermined maximum number of input signals.

12. The sound signal processing method of claim 9, wherein, for each of the plurality of spectral components, the value indicating the psychoacoustic importance of the spectral component is a speech-importance weighting corresponding to a frequency of the spectral component.

13. The signal processing method of claim 9, wherein each confidence measure is further based on a standard deviation of a plurality of differences, during a non-zero time period, between the energy of the input signal and one of the one or more noise-component estimates.

14. A sound signal processing method, comprising:

generating an electrical representation of a received sound signal;

determining one or more noise-component estimates for the received sound signal;

determining one or more confidence measures, wherein each of the one or more confidence measures is based on a standard deviation of a plurality of differences, during a non-zero time period, between the energy of the received sound signal and one of the one or more noise-component estimates, and wherein each of the one or more confidence measures provides an indication of a reliability of one of the one or more noise-component estimates, based on at least one of the one or more confidence measures, processing the electrical representation to provide a control signal; and using the control signal to cause a stimulator component of a stimulating prosthesis to provide a stimulus to a recipient of the stimulating prosthesis.

15. The method of claim 14, wherein processing the electrical representation to provide the control signal comprises, scaling an effect applied to a frequency component of the electrical representation.

16. The method of claim 14, wherein processing the electrical representation to provide the control signal comprises, scaling a gain applied to the electrical representation.

17. The method of claim 14, wherein, for each of the one or more noise-component estimates, generating the noise-component estimate comprises generating at least one signal-to-noise ratio estimate of the received sound signal.

18. The method of claim 14, wherein each of the one or more confidence measures has a value between zero and one.

19. The method of claim 14, wherein the stimulating prosthesis comprises a hearing prosthesis.

* * * * *